United States Patent
Itoh et al.

(10) Patent No.: US 9,967,920 B2
(45) Date of Patent: May 8, 2018

(54) ELECTRIC DEVICE OUTPUTTING LIGHT, WIND, HEAT OR SOUND

(71) Applicant: HITACHI KOKI CO., LTD., Tokyo (JP)

(72) Inventors: Takafumi Itoh, Ibaraki-ken (JP); Masato Sakai, Ibaraki-ken (JP); Yoshinori Ishizawa, Ibaraki-ken (JP); Masanori Okada, Ibaraki-ken (JP); Hiroyuki Hasegawa, Ibaraki-ken (JP); Takashi Kawamata, Ibaraki-ken (JP)

(73) Assignee: Hitachi Koki Co., Ltd., Tokyo (JP)

( * ) Notice: Subject to any disclaimer, the term of this patent is extended or adjusted under 35 U.S.C. 154(b) by 829 days.

(21) Appl. No.: 14/254,435

(22) Filed: Apr. 16, 2014

(65) Prior Publication Data

US 2014/0313706 A1    Oct. 23, 2014

(30) Foreign Application Priority Data

Apr. 18, 2013   (JP) .................................. 2013-087562
Apr. 18, 2013   (JP) .................................. 2013-087563
Apr. 18, 2013   (JP) .................................. 2013-087564

(51) Int. Cl.
*F21V 21/30*    (2006.01)
*H05B 1/02*     (2006.01)
(Continued)

(52) U.S. Cl.
CPC ........... *H05B 1/0288* (2013.01); *F16M 11/10* (2013.01); *F16M 13/022* (2013.01); *F21L 4/02* (2013.01);
(Continued)

(58) Field of Classification Search
CPC .... F04D 19/002; F04D 29/263; F04D 29/646; F21K 9/65; F16M 11/10; F16M 2200/08;
(Continued)

(56) References Cited

U.S. PATENT DOCUMENTS 2,830,779 A * 4/1958 Wentling ............... F04D 29/646
                                                                248/137
4,120,615 A * 10/1978 Keem .................. F04D 29/526
                                                                220/324
(Continued)

FOREIGN PATENT DOCUMENTS

CN    201983221 U    9/2011
CN    202171164 U    3/2012
(Continued)

OTHER PUBLICATIONS

English Translation, DE 20212010233 U1.*
(Continued)

*Primary Examiner* — Hargobind S Sawhney
(74) *Attorney, Agent, or Firm* — Kilpatrick Townsend & Stockton LLP

(57) ABSTRACT

This invention provides an electrical apparatus that includes a main body portion, a battery pack, and a frame portion. The main body portion comprises a converting portion that may convert electric power to one of light, wind, heat, and sound; and an outputting portion. The battery pack may detachably mounted on a battery holder provided at the main body portion, and may supply electric power to the converting portion. The frame portion may rotatably support the main body portion, and may define a first ground contact plane that can contact a ground surface and a second ground contact plane that can contact the ground surface at a different angle from an angle of the first ground contact plane. The main body portion may be rotatable relative to the frame portion without contacting the ground surface.

37 Claims, 15 Drawing Sheets

(51) Int. Cl.
*F21V 21/08* (2006.01)
*F21L 4/02* (2006.01)
*F16M 11/10* (2006.01)
*F21S 9/02* (2006.01)
*F21V 21/14* (2006.01)
*F16M 13/02* (2006.01)

(52) U.S. Cl.
CPC ............... *F21S 9/02* (2013.01); *F21V 21/08* (2013.01); *F21V 21/14* (2013.01); *F21V 21/30* (2013.01); *F16M 2200/08* (2013.01)

(58) Field of Classification Search
CPC ........ F21L 4/00; F21L 4/02; F21L 4/04; F21S 9/02; F21V 21/06; F21V 21/116; F21V 21/145; F21V 21/30; F21V 21/0965; F21V 21/14; F21V 21/406; F21V 23/005; F21V 23/007; F21V 23/008; F21V 23/0471; F21V 23/045; F24F 2221/17; F21W 2131/10
See application file for complete search history.

(56) References Cited

U.S. PATENT DOCUMENTS

| | | | | |
|---|---|---|---|---|
| 4,222,318 A | * | 9/1980 | Patton | ............... F04D 25/08 |
| | | | | 248/126 |
| 4,341,151 A | | 7/1982 | Sakamoto | |
| 4,657,483 A | * | 4/1987 | Bede | ............... F04D 29/545 |
| | | | | 415/210.1 |
| 6,120,164 A | | 9/2000 | Libin et al. | |
| 6,126,415 A | * | 10/2000 | Lasko | ............... F04D 29/646 |
| | | | | 416/146 R |
| 6,589,018 B2 | * | 7/2003 | Chen | ............... F04D 29/263 |
| | | | | 310/71 |
| 6,679,406 B2 | | 1/2004 | Sakai et al. | |
| 6,905,052 B2 | | 6/2005 | Sakai et al. | |
| 7,344,054 B2 | | 3/2008 | Sakai et al. | |
| 7,490,746 B2 | | 2/2009 | Sakai et al. | |
| 7,621,652 B2 | | 11/2009 | Zick | |
| 7,645,045 B2 | * | 1/2010 | Chuang | ............... F16M 11/242 |
| | | | | 362/249.01 |
| D610,673 S | * | 2/2010 | Sterpka | ............... D23/411 |
| 7,850,513 B1 | * | 12/2010 | Parker | ............... F04D 25/0606 |
| | | | | 136/245 |
| 8,025,418 B2 | | 9/2011 | Zick | |
| 8,506,125 B2 | * | 8/2013 | Pohlert | ............... G03B 15/02 |
| | | | | 362/11 |
| 2004/0179361 A1 | * | 9/2004 | Hussaini | ............... F21L 14/00 |
| | | | | 362/231 |
| 2009/0097250 A1 | | 4/2009 | Leasure et al. | |
| 2010/0232147 A1 | | 9/2010 | Bryant et al. | |
| 2012/0183390 A1 | | 7/2012 | Pan | |
| 2012/0269663 A1 | * | 10/2012 | Kamiya | ............... F04D 25/084 |
| | | | | 417/411 |
| 2013/0135866 A1 | * | 5/2013 | Souvay | ............... F21K 9/00 |
| | | | | 362/249.02 |

FOREIGN PATENT DOCUMENTS

| | | | |
|---|---|---|---|
| CN | 202733648 U | 2/2013 | |
| DE | 10 2011 108 709 A1 | 1/2013 | |
| DE | 102011108709 A1 * | 1/2013 | ............. F21V 21/06 |
| DE | 20 2012 010 233 U1 | 3/2013 | |
| GB | 2424694 A | 10/2006 | |
| JP | 54-057887 U | 4/1979 | |
| JP | 61-173471 U | 10/1986 | |
| JP | 63-008268 U | 1/1988 | |
| JP | 04-135101 U | 12/1992 | |
| JP | H09-20173 A | 1/1997 | |
| JP | 09-045103 A | 2/1997 | |
| JP | 2002-254358 A | 9/2002 | |
| JP | 3114617 U | 10/2005 | |
| JP | 2011-159447 A | 8/2011 | |
| JP | 2011-166254 A | 8/2011 | |
| JP | 2012-233469 A | 11/2012 | |

OTHER PUBLICATIONS

Extended European Search Report for patent application EP14165056.4 (Oct. 29, 2014).
"Put into the right Perspective," press release from Metabowerke GmbH dated Mar. 18, 2013.
"The world's first power tool manufacturer to bring 5.2Ah battery packs to the market," press release from Metabowerke GmbH dated Mar. 18, 2013.
Japan Patent Office Decision of Rejection for patent application JP2013-087562 (Aug. 8, 2017), 4 pages.
Japan Patent Office Office Action for patent application JP2013-087563 (Dec. 3, 2016), 2 pages.
Japan Patent Office Office Action for patent application JP2013-087564 (Feb. 3, 2017), 9 pages.
Japan Patent Office Office Action for patent application JP2013-087564 (Sep. 28, 2017), 9 pages.
Japan Patent Office Office Action for patent application JP2013-087562 (Feb. 9, 2017), 11 pages.
China Patent Office office action for patent application CN201410157957.7 (Dec. 14, 2017), 52 pages with translation.

* cited by examiner

ELECTRIC DEVICE OUTPUTTING LIGHT, WIND, HEAT OR SOUND

CROSS REFERENCE TO RELATED APPLICATION

This application claims priorities from Japanese Patent Applications No. 2013-087562 filed Apr. 18, 2013; No. 2013-087563 filed Apr. 18, 2013; and No. 2013-087564 filed Apr. 18, 2013. The entire contents of the priority applications are incorporated herein by reference.

TECHNICAL FIELD

The present invention relates to an electric device and a projector that converts electric power to one of light, wind, heat or sound.

BACKGROUND

An electrical apparatus for converting electric power to one of light, wind, heat, and sound and for outputting the same to outside is used at a severe site such as a construction site. As illustrated in Japanese Patent Application Publication No. 2011-166254, hereby incorporated by reference, the electrical apparatus may provide a frame portion such as a guard bar.

The electrical apparatus also needs to be fixed at an output direction of the light, wind, heat, or sound. Hence, during its operation, the electrical apparatus is placed on a flat surface, or is mounted on a tripod with a fastener such as a vise. The Japanese Patent Application Publication No. 2002-254358 discloses an electrical apparatus provided with a rotatable hook to hang on a tube pipe, and the hook may be applicable to such the electrical apparatus.

In addition, if a projection surface from which light is projected is damaged, the light projection is hampered, and the projector cannot perform its function. Accordingly, a guard member is usually provided at the front side of the projection surface for protecting the projection surface. For example, Japanese Patent Application Publication No. H09-20173 provides a shielding plate serving also as the guard member and closing the shielding plate to prevent mud from sticking to the projection surface.

SUMMARY

A cordless type of such electrical apparatus is becoming increasingly common, and a compact and lightweight apparatus is desired for easy handling. In addition, because such electrical apparatus needs to output light, wind, heat, or sound at various positions and directions depending on the work area, it is desired that the electrical apparatus has a self-standing mechanism for allowing the apparatus to stand on its own and a rotational mechanism for setting the projection direction to an arbitrary direction. Further, because such electrical apparatus often projects light downward from an upper position, the apparatus must be a product that can endure impacts due to a drop etc.

In the prior art, however, it is difficult to provide an electrical apparatus and a projector that are compact and lightweight, that have a self-standing mechanism and a rotational mechanism, and that have durability for enduring impacts due to drop or the like.

The prior art yet infers a problem that the hook cannot fix the position of the apparatus. Moreover, the hook provided at the handle is an obstacle to the handler or the operator of the apparatus when carried.

In the prior art, there is also a problem that, if the guard member is attached to the front side of the projection surface, a shadow due to the guard member is formed when light is projected, which makes work difficult.

In view of the foregoing, it is a first object of the invention to provide an electrical apparatus and a projector that are compact and lightweight, that have a self-standing mechanism and a rotational mechanism, and that have durability for enduring impacts due to drop or the like. It is another object of the invention to provide an electrical apparatus and a projector that are easy to use even with a frame portion.

As a second object, it is also an purpose of the invention to provide an electrical apparatus and a projector that can be fixed to a tube pipe only by hanging the hook on the tube pipe, and that does not have an obstacle to the handler or the operator of the apparatus.

It is a third object of the invention to provide an electrical apparatus and a projector so configured that, even if the guard member is attached to the front side of the projection surface, a shadow due to the guard member is not formed when light is projected, which allows work to be done comfortably.

In order to attain the first object, the present invention provides an electrical apparatus including a main body portion, a battery pack, and a frame portion. The main body portion may have a converting portion that converts electric power to one of light, wind, heat, and sound; and has an outputting portion that outputs, to outside, the one of light, wind, heat, and sound outputted from the converting portion. The battery pack may be detachably mounted on a battery holder provided at the main body portion, and may be configured to supply electric power to the converting portion. The frame portion may rotatably support the main body portion, and may define a first ground contact plane that can contact a ground surface and a second ground contact plane that can contact the ground surface at a different angle from an angle of the first ground contact plane. The main body portion and the battery pack may be rotatably movable relative to the frame portion without contacting the ground surface when one of the first ground contact plane and the second ground contact plane contacts the ground surface.

In order to attain the first object, the present invention provides an electrical apparatus including a main body portion, a battery pack, a frame portion. The main body portion may include a converting portion that converts electric power to one of light, wind, heat, and sound. The main body portion may also include an outputting portion that outputs, to outside, the one of light, wind, heat, and sound outputted from the converting portion. The battery pack may be detachably mounted on a battery holder provided at the main body portion and configured to supply electric power to the converting portion. The frame portion may rotatably support the main body portion, and defines a guard region surrounded by an outer periphery of the frame portion. The battery pack is arranged inside the guard region.

In order to attain the first object, the present invention provides an electrical apparatus including a main body portion, a battery pack, and a frame portion. The main body portion may have a converting portion that converts electric power to one of light, wind, heat, and sound; and an outputting portion that outputs, to outside, the one of light, wind, heat, and sound outputted from the converting portion. The battery pack may be detachably mounted on a battery holder provided at the main body portion and configured to supply electric power to the converting portion. The frame portion may rotatably support the main body portion, and may define a guard region surrounded by an outer periphery of the frame portion. The battery pack may be located inside the guard region if the outputting portion is located outside the guard region.

In order to attain the first object, the present invention provides an electrical apparatus including a main body portion, a battery pack, and a frame portion. The main body portion may have a converting portion that converts electric power to one of light, wind, heat, and sound; and an outputting portion that outputs, to outside, the one of light, wind, heat, and sound outputted from the converting portion. The battery pack detachably may be mounted on a battery holder provided at the main body portion and configured to supply electric power to the converting portion. The frame portion may rotatably support the main body portion, and may define a guard region surrounded by an outer periphery of the frame portion. The main body portion may have a protruding amount larger than that of the battery pack when a part of the battery pack protrudes outside of the guard region.

In order to attain the first object, the present invention provides an electrical apparatus including a main body portion, a battery pack, a frame portion. The main body portion may have a converting portion that converts electric power to one of light, wind, heat, and sound; and an outputting portion that outputs, to outside, the one of light, wind, heat, and sound outputted from the converting portion. The battery pack is detachably mounted on a battery holder provided at the main body portion and configured to supply electric power to the converting portion. The frame portion may rotatably support the main body portion, and may be provided with a support mechanism that rotatably supports the main body portion. The frame portion may include side frames located left and right sides of the outputting portion, a top frame located above the outputting portion, and a bottom frame located below the outputting portion. The frame portion may be an integration of the side frames, the top frame, and the bottom frame which are constrained relative to one another.

In order to attain the first object, the present invention provides an electrical apparatus including a main body portion, a pair of side frames, a pair of bottom frames, and a pair of bottom frames. The main body portion may have a housing having a projection surface of light emitted from a built-in light source at a front side; and a battery mounted at a rear side of the housing. The pair of side frames may protect side surfaces of the main body portion. The support mechanism may rotatably support the main body portion with a rotational shaft substantially perpendicular to the pair of side frames. The pair of bottom frames extending rearward from lower ends of the pair of side frames thereby serving as a foot portion, and may define a substantially triangle guard region that is a substantially triangle shape. The guard region has one of the pair of side frames and one of the pair of bottom frames as two sides of the triangle. The battery is arranged in the substantially triangle guard region when viewed from a side frame in a state where the bottom frame is put on ground and the projection surface of the main body portion is oriented vertically so that a projection direction is set horizontally to a front side.

In order to attain the second object, the present invention provides an electrical apparatus including a main body portion, a pair of side frames, and a pair of bottom frames. The main body portion may include a housing having a projection surface of light emitted from a built-in light source at a front side, may include a tripod hole formed at a part other than side surfaces of the housing, and may have a battery mounted at a rear side of the housing. In the pair of side frames, a support mechanism for rotatably supporting the main body portion may be integrated. The pair of bottom frames may extend rearward from lower ends of the pair of side frames.

In order to attain the second object, the present invention provides an electrical apparatus that may include a main body portion, and a frame portion. The main body portion may have a converting portion that converts electric power to one of light, wind, heat, and sound; and an outputting portion that outputs externally one of light, wind, heat, and sound outputted from the converting portion. The frame portion may rotatably support the main body portion. The frame portion may define a first ground contact plane that can contact a ground surface. The outputting portion may be disposed at a forward part of the first ground contact plane. The rearward part of the first ground contact plane has a hook.

In order to attain the second object, the present invention provides an electrical apparatus that may include a main body portion, a frame portion, a battery pack. The main body portion may have a converting portion that converts electric power to one of light, wind, heat, and sound; and an outputting portion that outputs, to outside, the one of light, wind, heat, and sound outputted from the converting portion. The frame portion may rotatably support the main body portion. The frame portion may be provided with a hook. The battery pack may be configured to supply the converting portion with electric power. Both of the battery pack and a tube pipe may be located inside a guard region surrounded by an outer periphery of the frame portion when the hook is hooked on the tube pipe.

In order to attain the second object, the present invention provides an electrical apparatus that may include a main body portion, a frame portion. The main body portion may have a converting portion that converts electric power to one of light, wind, heat, and sound; and an outputting portion that outputs externally one of light, wind, heat, and sound outputted from the converting portion. The frame portion may rotatably support the main body portion, may be provided with a hook, and may be rotatably connected to the main body portion such that the main body portion is rotatable about a rotational shaft extending in a leftward/rightward direction of the main body portion. The hook may be movable in an axial direction of a tube pipe when the hook is hooked on the tube pipe.

In order to attain the second object, the present invention provides an electrical apparatus that may include a main body portion, and a frame portion. The main body portion may have, at a front side, a projection surface of light emitted from a built-in light source. The frame portion may protect the main body portion, and may have a surface that confronts the main body portion and has a claw portion formed with a concave portion extending in a direction substantially perpendicular to a projection direction in which light is projected.

In order to attain the second object, the present invention provides an electrical apparatus that may include a main body portion, a pair of side frames, a pair of bottom frames, a top frame, a connection frame, and a hook. The main body portion may have, at a front side, a projection surface of light emitted from a built-in light source. The pair of side frames may protect side surfaces of the main body portion. The pair of bottom frames may extend rearward from lower ends of the pair of side frames and that serves as foot portions. The top frame may connect the pair of side frames. The connection frame may connect the pair of bottom frames. The hook may be provided at the connection frame.

In order to attain the third object, the present invention provides an electrical apparatus that may include a main body portion, an LED board, a transparent plate, and a cover member. The main body portion may have a housing having a light source accommodated therein; and a battery mounted at a rear side of the housing. The LED board may have a mount surface on which a plurality of LEDs is mounted. The plurality of LEDs may serve as the light source. The LED board may be accommodated in the housing such that the mount surface faces toward a front side. The transparent plate may be disposed to confront the mount surface and may be configured to serve as a projection surface of light emitted from the plurality of LEDs. The cover member may bridge over the projection surface while avoiding a projection region of the plurality of LEDs on the projection surface.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
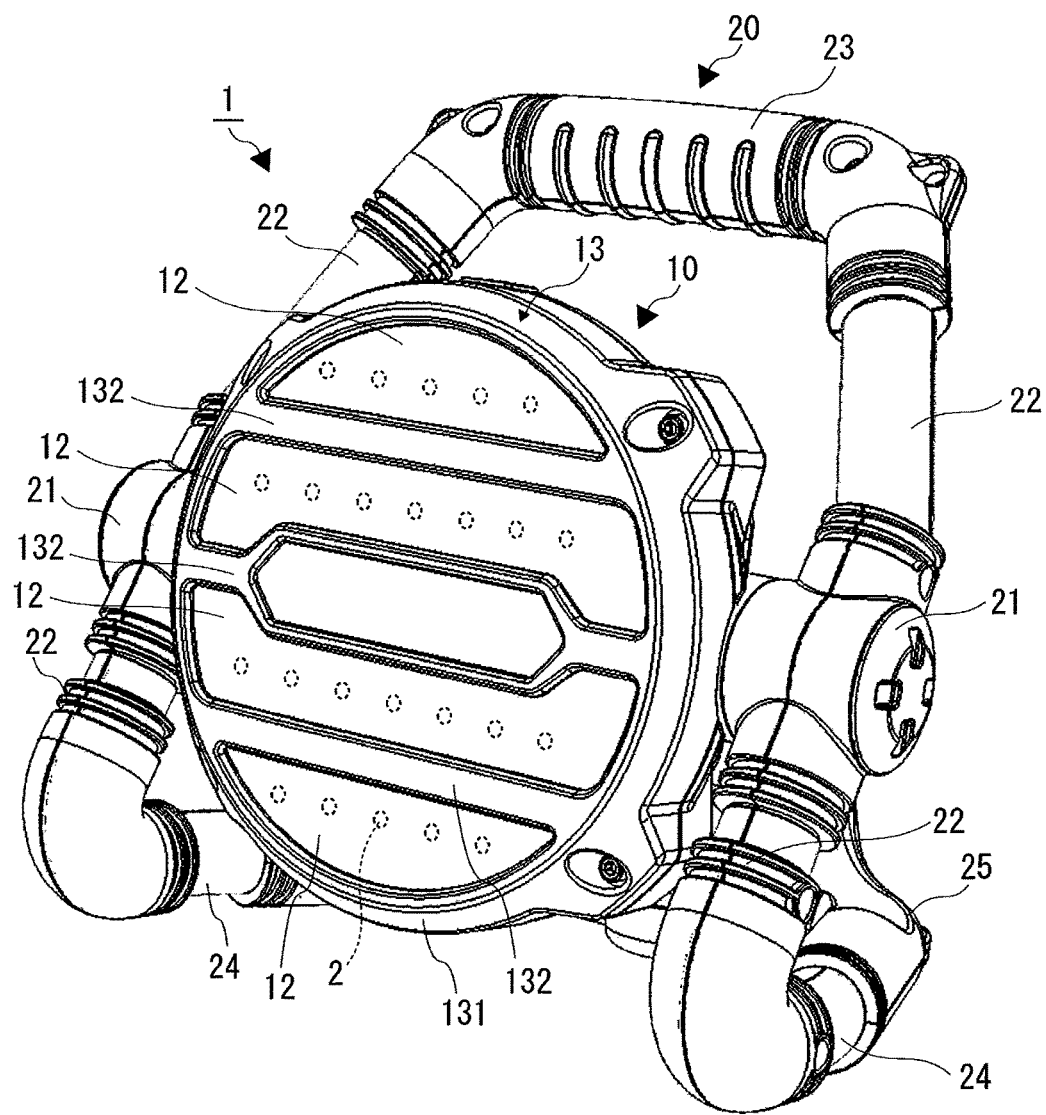
FIG. 1 is a perspective view of a projector according to a first embodiment of the present invention.

Embodiments of the invention will be described while referring to the accompanying drawings wherein like parts and components are designated by the same reference numerals to avoid duplicating description.

First Embodiment

An electrical apparatus of a first embodiment is a projector 1 that converts electric power to light and projects the light. As shown in FIG. 1, the projector 1 includes a main body portion 10 and a frame portion 20. The main body portion 10 includes a plurality of LEDs 2 serving as light sources. The frame portion 20 surrounds the main body portion 10 to protect (guard) the main body portion 10. The LEDs 2 serve as a converting portion that converts electric power to light.

Figure 2:
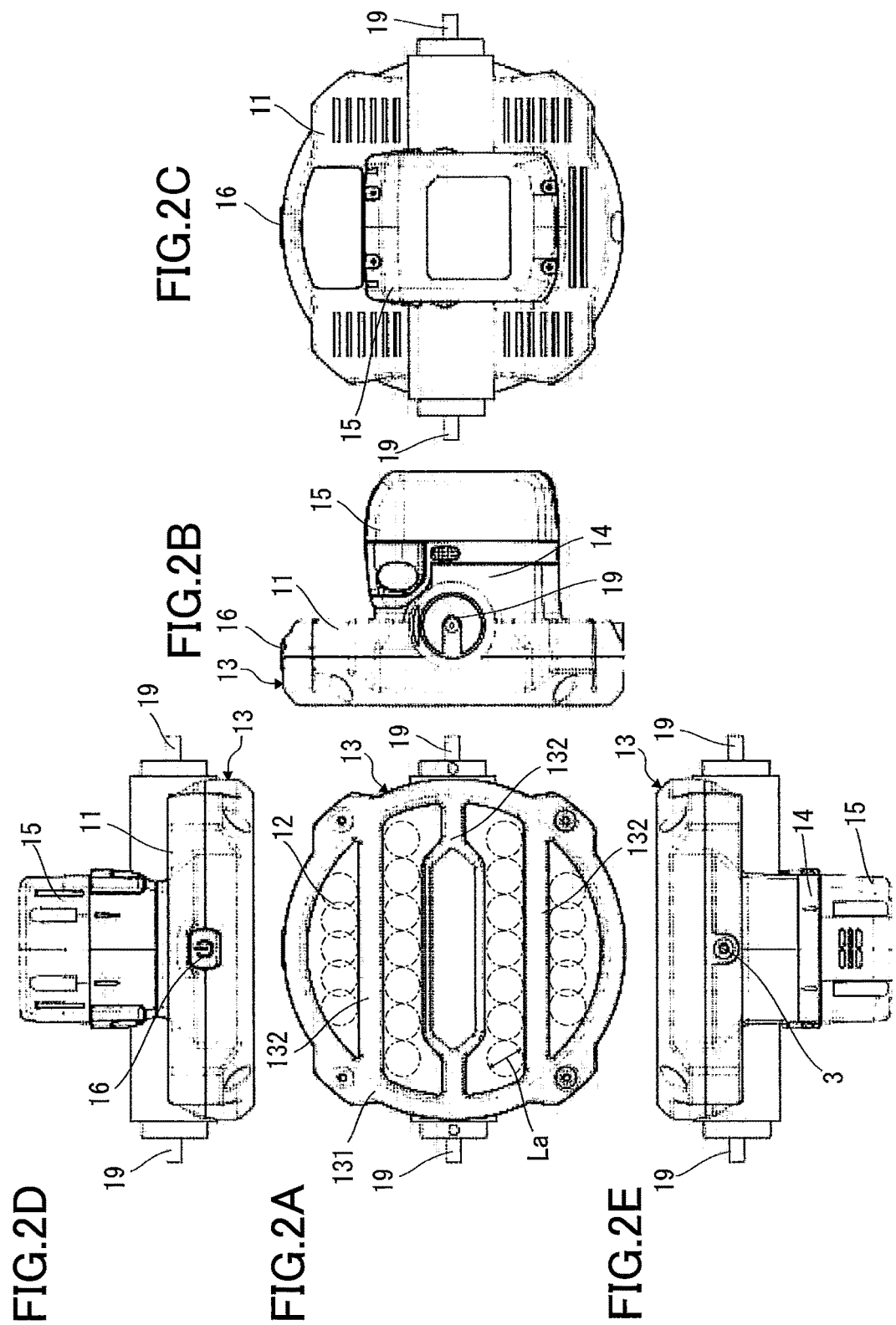
FIGS. 2A to 2E are orthographical drawings illustrating an exterior shape of a main body portion of the projector.

As shown in FIGS. 1 and 2, the main body portion 10 includes a housing 11 having a hollow disc shape, a disc-shaped transparent plate 12 disposed at the front side of the housing 11, a cover member 13 attached to the housing 11 from the front side of the transparent plate 12, a battery holder 14 formed at the rear side of the housing 11, and a battery pack 15 that is a power source for lighting the LEDs 2. FIG. 2A is a front view, 2B is a side view, 2C is a rear view, 2D is a top view, and 2E is a bottom view. Note that the transparent plate 12 serves as an outputting portion that outputs light emitted from the LEDs 2 to the outside.

The battery pack 15 is detachably mounted on the battery holder 14. In the battery pack 15, a plurality of battery cells such as nickel-metal-hydride and lithium-ion is accommodated. A switch 16 is provided at the upper surface of the housing 11. A control board (not shown) is accommodated within the battery holder 14. The control board is electrically connected with the battery pack 15 and the switch 16, and controls lighting of the LEDs 2 in accordance with the operations of the switch 16.

Figure 3:
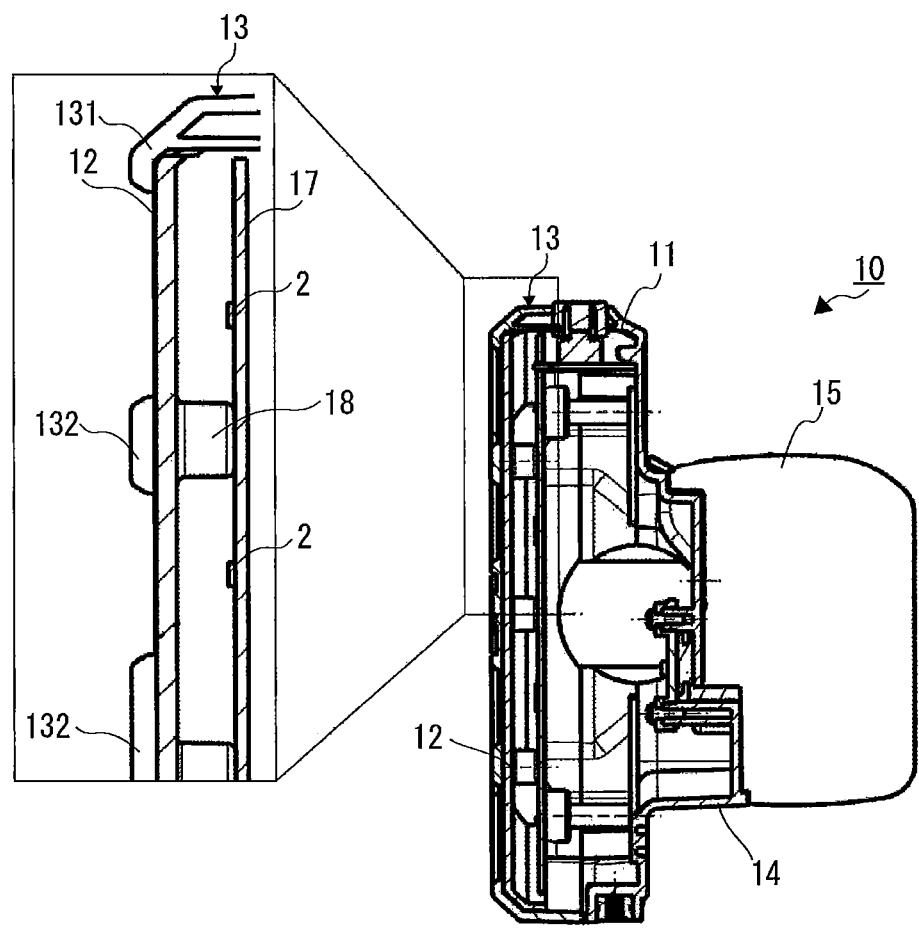
FIG. 3 is a cross-sectional view of the main body portion illustrating a partial view of the internal configuration.

A print circuit board 17 is an LED circuit board on which the plurality of LEDs 2 is mounted. As shown in FIG. 3, the print circuit board 17 is accommodated in the housing 11 such that a mount surface of the LEDs 2 faces toward the front side. As the transparent plate 12, an acrylic plate or a glass plate having good transparency is used. The transparent plate 12 serves as a projection surface of light emitted by the LEDs 2. A spacer 18 is provided between the transparent plate 12 and the print circuit board 17. The transparent plate 12 and the print circuit board 17 are arranged such that the transparent plate 12 and the mount surface of the LEDs 2 of the print circuit board 17 confront each other by a predetermined distance therebetween. Accordingly, light emitted from the LEDs 2 transmits the transparent plate 12 that is the projection surface, and is projected on the front side of the housing 11. The space between the LEDs 2 mounted on the print circuit board 17 and the transparent plate 12 serves as a heat-dissipation clearance for dissipating heat generated from the LEDs 2.

Figure 4:
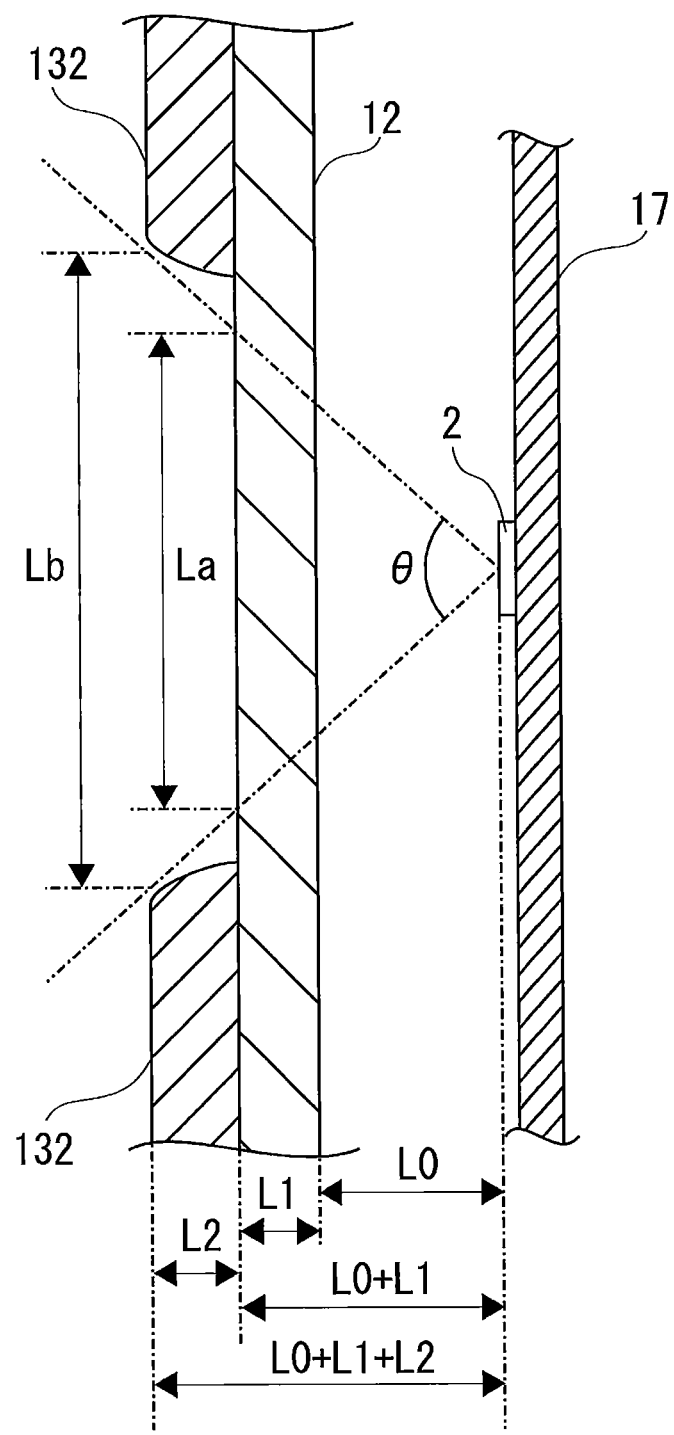
FIG. 4 is a schematic illustration showing LEDs and a cover of the projector.

The cover member 13 is a member for preventing damages of the transparent plate 12. As shown in FIGS. 1 and 2A, the cover member 13 includes a fringe portion 131 and bumper portions 132. The fringe portion 131 is disposed at the periphery of the transparent plate 12, that is, the projection surface so as to cover the periphery of the projection surface. The bumper portions 132 are three bar-shaped members that bridge over the transparent plate 12, that is, the projection surface and that cover the projection surface. The bumper portions 132 are arranged at positions that do not block light emitted from the LEDs 2. That is, as shown in FIG. 4, assuming that a projection angle of the LEDs 2 is "θ", that the heat-dissipation clearance between the LEDs 2 and the transparent plate 12 is "L0", and that thickness of the transparent plate 12 is "L1", a spread of light emitted from the LEDs 2 is $La=2(L0+L1)\times\tan(\theta/2)$ in the surface of the transparent plate 12. Accordingly, as indicated by the single-dot chain lines in FIG. 2A, projection regions in the surface of the transparent plate 12 (regions through which lights emitted from the LEDs 2 transmit) are circles of diameter La, which correspond to the arrangement of the LEDs 2. The shapes of the fringe portion 131 and the bumper portion 132 of the cover member 13 are set to avoid the projection regions in the surface of the transparent plate 12. Additionally, the spacers 18 provided between the transparent plate 12 and the print circuit board 17 are arranged at positions facing the fringe portion 131 and the bumper portion 132 of the cover member 13, avoiding the projection region in the surface of the transparent plate 12.

In the first embodiment, as shown in FIG. 1, four LED arrays are arranged. In each of the LED arrays, a plurality of LEDs 2 is arranged in a horizontal direction. The interval of the LED arrays is set to a value larger than La. Accordingly, the respective bumper portions 132 are provided between the LED arrays, by avoiding the projection regions. Hence, the interval between the bumper portions 132 is set to a value larger than or equal to La, by avoiding the projection regions. If thickness "L2" of the bumper portion 132 is taken into account, the distance between edges of the bumper portions 132 may be set to a value larger than or equal to Lb=2 (L0+L1+L2)×tan (θ/2), or slanted surfaces adjusted to the spread of projected light may be provided.

Figure 5:
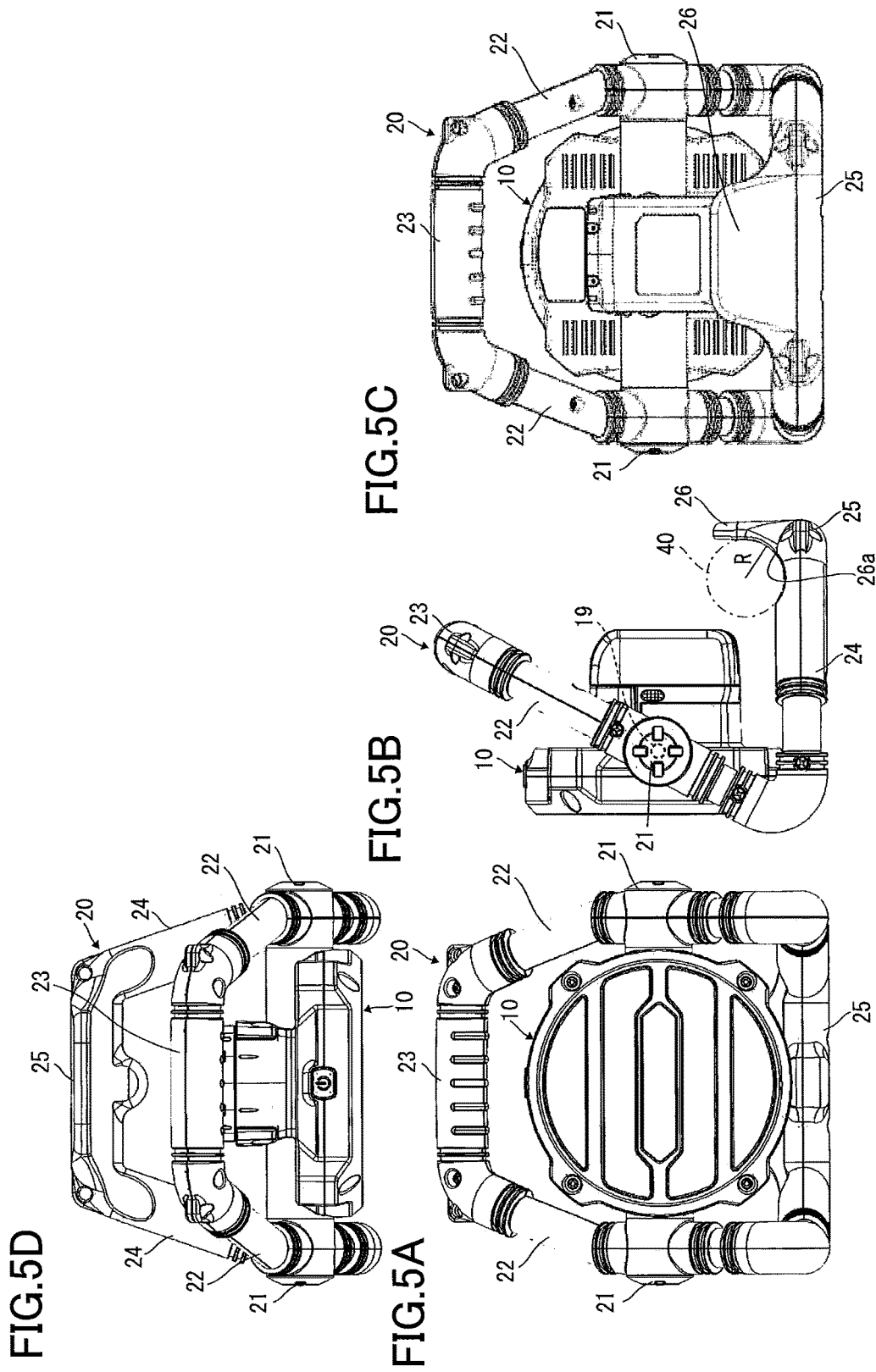
FIGS. 5A to 5D are orthographical drawings showing a configuration of the projector.

As shown in FIG. 2, rotational shafts 19 are provided coaxially in both side surfaces of the housing 11. A tripod hole 3 is formed in a lower surface of the housing 11. The rotational shafts 19 are located between the projection surface (the transparent plate 12) and the battery pack 15. The rotational shafts 19 are arranged in a direction parallel to the print circuit board 17 and the transparent plate 12, that is, a direction perpendicular to the projection direction. The tripod hole 3 is formed in the lower surface of the housing 11, which is a part other than the side surfaces supported by the frame portion 20, so that the main body portion 10 can be supported by a tripod without detaching the frame portion 20 from the main body portion 10. As shown in FIGS. 1 and 5, the rotational shafts 19 are rotatably supported by a support mechanism 21 that is integrated into a part of the frame portion 20. FIG. 5A indicates a front view, FIG. 5B is a side view, FIG. 5C shows a rear view, and FIG. 5D illustrates a top view.

The frame portion 20 includes a pair of side frames 22 arranged at the both sides of the main body portion 10 for protecting the side surfaces of the main body portion 10, a top frame 23 connecting upper ends of the pair of side frames 22, a pair of bottom frames 24 extending rearward from lower ends of the pair of side frames 22 and serving as foot portions, and a connection frame 25 connecting rear ends of the pair of bottom frames 24. The side frames 22, the top frame 23, the bottom frames 24, and the connection frame 25 are integrated so as not to move relative to one another. In a state where the front surface of the main body portion 10 in which the transparent plate 12 (serving as the outputting portion) is provided faces forward as shown in FIG. 5B, when the front surface of the main body portion 10 is viewed from the front side as shown in FIG. 5A, the side frames 22 are located at the left and right sides of the main body portion 10, the top frame 23 is located at the upper side of the main body portion 10, and the bottom frame 24 is located at the lower side of the main body portion 10. The support mechanism 21 is integrated into parts of the side frames 22, and rotatably supports the rotational shafts 19 of the main body portion 10 such that the rotational shafts 19 are substantially perpendicular to the side frames 22. The top frame 23 and the bottom frame 24 are arranged substantially parallel to the rotational shafts 19 of the main body portion 10. The top frame 23 and the bottom frame 24 are arranged at such positions that the frames 23 and 24 do not contact the main body portion 10 even when the main body portion 10 rotationally moves about the rotational shafts 19, that is, outside of a rotational movement region of the main body portion 10.

The side frame 22 and the bottom frame 24 are formed in substantially an L-shape in a side view. The angle formed by the side frame 22 and the bottom frame 24 is an acute angle, so that, even when the main body portion 10 rotationally moves about the rotational shafts 19, the center of gravity of the main body portion 10 is always located above the bottom frame 24 in a side view shown in FIG. 5B. With this arrangement, the projector 1 can stand on its own in a state where the bottom frames 24 serving as foot portions and the connection frame 25 are put on ground, that is, a state where a first ground contact plane defined by the pair of bottom frames 24 is put on ground. In the first embodiment, the angle formed by the side frame 22 and the bottom frame 24 is set to substantially 60 degrees. In a state where the bottom frame 24 and the connection frame 25 are put on ground so that the projector 1 stands on its own, the rotational shafts 19 of the main body portion 10, the bottom frames 24, and the connection frame 25 are arranged substantially parallel to the ground surface. In this state, the main body portion 10 and the battery pack 15 can rotationally move relative to the frame portion 20, without contacting the ground surface. Further, in a state where the bottom frames 24 and the connection frame 25 are put on ground so that the projector 1 stands on its own, the bottom frames 24 and the connection frame 25 are located further rearward than the rotational shafts 19 of the main body portion 10. Accordingly, the rotation of the main body portion 10 allows the projection direction to move up and down in a broad range of the front side, while the bottom frames 24 and the connection frame 25 do not block the light projected from the front surface (the transparent plate 12) of the main body portion 10. Further, in a state where the bottom frame 24 and the connection frame 25 are put on ground so that the projector 1 stands on its own, the top frame 23 is arranged substantially parallel to the ground surface. Accordingly, the top frame 23 is arranged at a position that a user can grip easily from substantially above the main body portion 10, and functions as a handle for carrying the projector 1.

Figure 6:
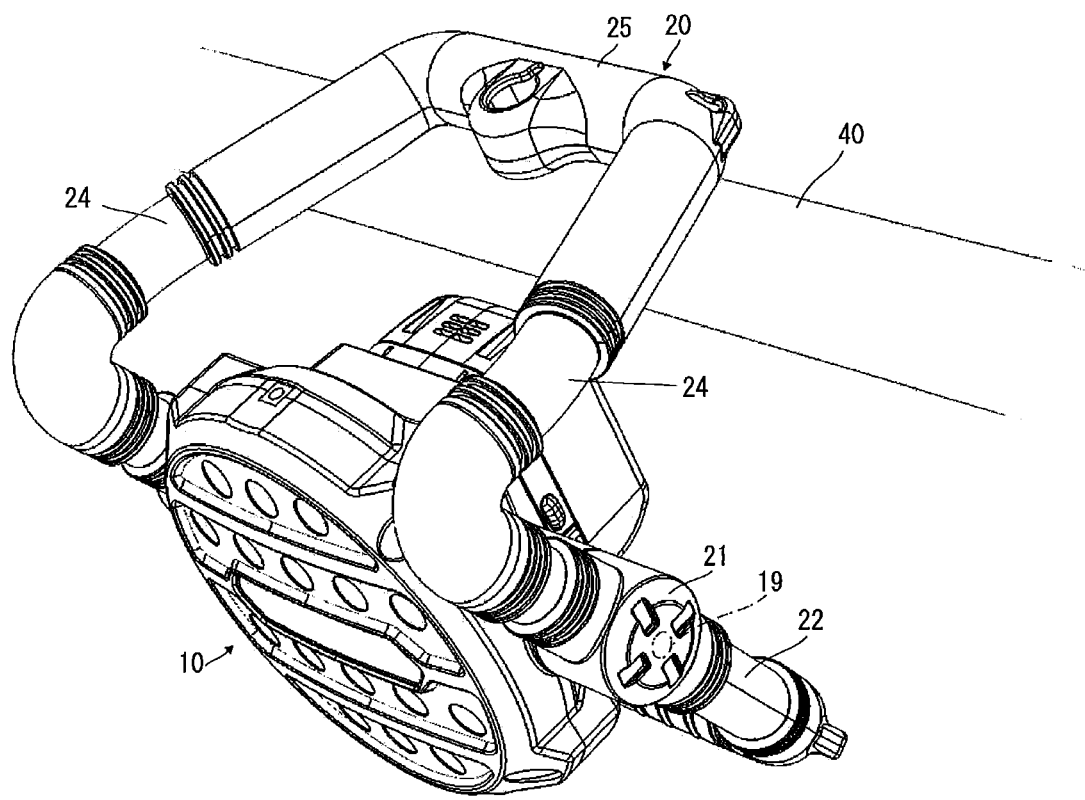
FIG. 6 is a perspective view of the projector projecting light downward.

As shown in FIGS. 5B and C, the connection frame 25 is formed with a claw portion 26 that protrudes substantially upward and that forms substantially 90 degrees with the bottom frames 24. That is, the front surface of the main body portion 10 is arranged at a front part with respect to the first ground contact plane, and the claw portion 26 is provided at a rear part with respect to the first ground contact plane. In a surface of the claw portion 26 confronting the main body portion 10, a concave portion 26a is formed to extend in a direction substantially parallel to the rotational shafts 19 of the main body portion 10. With this arrangement, the claw portion 26 functions as a hook. As shown in FIG. 6, by reversing the orientation of the projector 1 upside down and hooking the claw portion 26 on a tube pipe 40, the projector 1 can be used in a state hung from the tube pipe 40. In a state hung from the tube pipe 40, because the concave portion 26a contacts the tube pipe 40, the rotational shafts 19 are positioned substantially parallel to the tube pipe 40. Thus, the projector 1 projects light in a direction intersecting the tube pipe 40, that is, in a direction substantially perpendicular to the tube pipe 40. Further, in a state hung from the tube pipe 40, the connection frame 25 is located at an upper side of the rotational shafts 19 of the main body portion 10. Accordingly, by rotatably moving the main body portion 10, light projected from the front surface (the transparent plate 12) side of the main body portion 10 is not blocked by the connection frame 25, and the projection direction can be moved in a broad range at the lower side. In the present embodiment, the concave portion 26a is formed with a partially cylindrical surface of which the axial direction is substantially parallel to the rotational shafts 19 of the main body portion 10. Because a conventional tube pipe has a diameter of 48.6 mm, a curvature radius R of the concave portion 26a is set to radius R=24.3 mm, for example. The claw portion 26 is arranged at such a position that, even if the main body portion 10 rotatably moves about the rotational shafts 19 in a state where the tube pipe 40 of radius R is in contact with the concave portion 26a, the main body portion 10 does not contact the tube pipe 40. That is, the claw portion 26 is located at a position separated from the rotational movement region of the main body portion 10 by a distance larger than or equal to at least twice the curvature radius R of the concave portion 26a. Further, because the concave portion 26a is formed with a partially cylindrical surface, the claw portion 26 can be easily moved in left and right direction relative to the tube pipe 40, that is, along the tube pipe 40 in a state where the claw portion 26 is hooked on the tube pipe 40.

Figure 7:
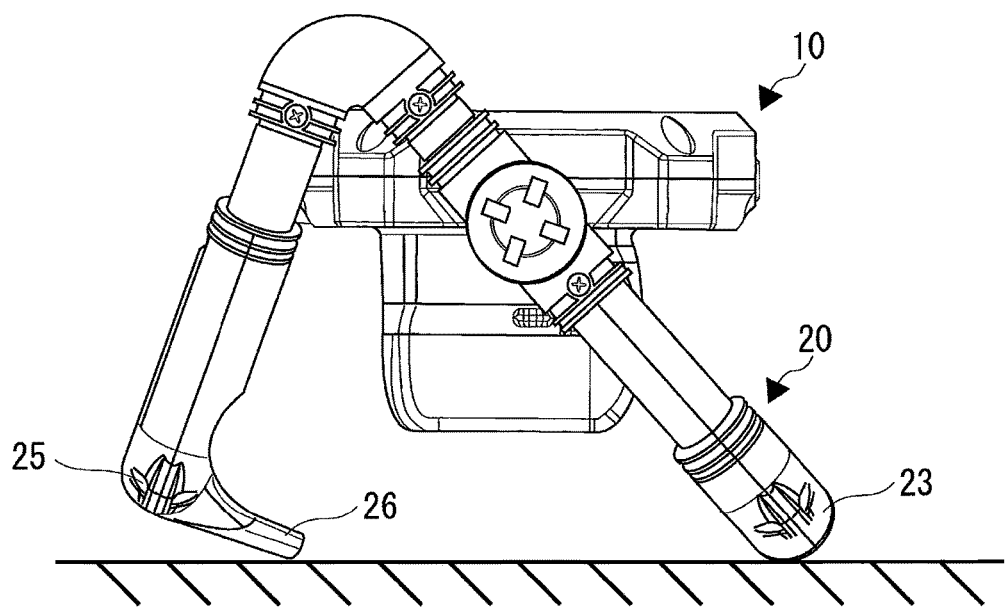
FIG. 7 is a side view of the projector projecting light upward.

Further, as shown in FIG. 7, the projector 1 can also stand on its own in a state where the top frame 23 and the claw portion 26 of the connection frame 25 are put on ground, that is, a second ground contact plane defined by the top frame 23 and the claw portion 26 of the connection frame 25 is put on ground. In a state where the top frame 23 and the connection frame 25 are put on ground so that the projector 1 stands on its own, the rotational shafts 19 of the main body portion 10, the top frame 23, and the connection frame 25 are arranged substantially parallel to the ground surface, and the main body portion 10 and the battery pack 15 can rotatably move relative to the frame portion 20 without contacting the ground. Further, in a state where the top frame 23 and the connection frame 25 are put on ground so that the projector 1 stands on its own, the bottom frame 24 and the connection frame 25 are located at a lower position than the rotational shafts 19 of the main body portion 10. Accordingly, when the main body portion 10 is rotatably moved, light projected from the front surface (the transparent plate 12) of the main body portion 10 is not blocked by the bottom frame 24 and the connection frame 25. Hence, the projection direction can be moved in a broad range at the upper side.

The frame portion 20 is made from a plurality of molded parts by resin molding using hard resin. The substantially U-shaped top frame 23 and the side frames 22 up to the support mechanisms 21 are integrated by two molded parts. Further, a bent portion composed of the bottom frame 24 and the side frame 22 that extends from the support mechanism 21 to the connection frame 25 is also integrated by two molded parts. With this arrangement, the number of molded parts constituting the frame portion 20 can be reduced, and the assembly process can be simplified.

Next, an example of usage of the projector 1 will be described in detail while referring to FIGS. 8 through 10.

In the projector 1, by rotatably moving the main body portion 10 about the rotational shafts 19, the projection direction can be set to vertically all angles from directly upward to directly downward.

Figure 8A:
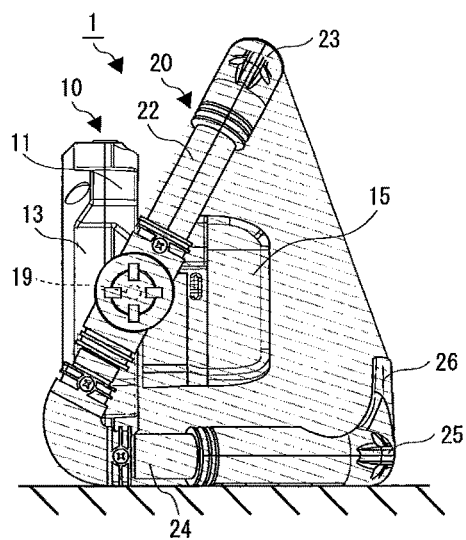
FIGS. 8A to 8C are side views of the projector projecting light in various directions.
Figure 8B:
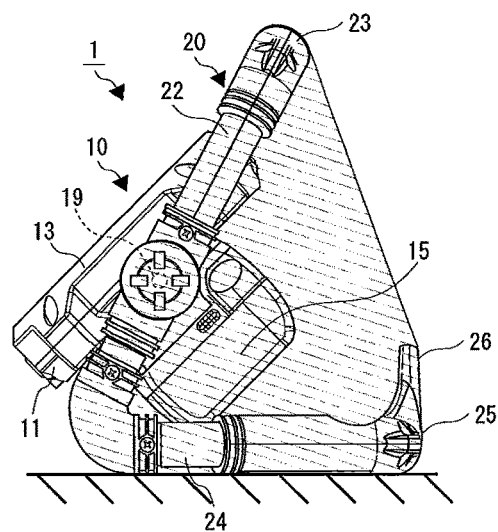
Figure 8C:
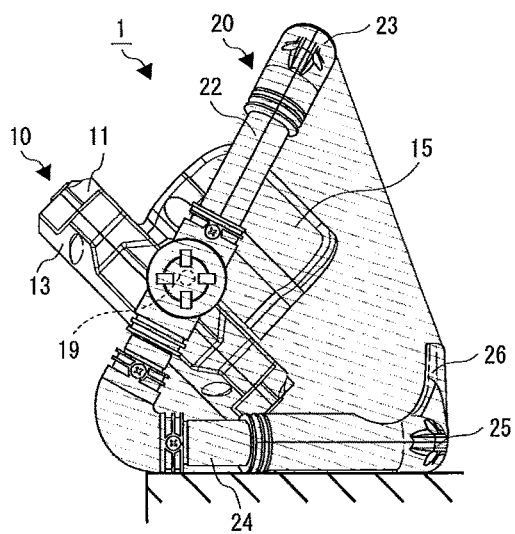

The setting of projection directions in horizontal projection from 45-degree obliquely upward to 45-degree obliquely downward can be performed in a state where the bottom frames 24 and the connection frame 25 are put on ground so that the projector 1 stands on its own. FIG. 8A-8C show states in which the bottom frames 24 and the connection frame 25 are put on ground so that the projector 1 stands on its own. In FIG. 8A, the projector 1 is set such that the projection direction is oriented horizontally toward the front. In FIG. 8B, the projector 1 is set such that the projection direction is oriented to the front 45-degree obliquely upward. In FIG. 8C, the projector 1 is set such that the projection direction is oriented to the front 45-degree obliquely downward.

As shown in FIG. 8A, a position in which the projection surface is vertical and the projection direction is set horizontally facing front is a home position that is considered to be most frequently used. When at the home position, the battery pack 15 is arranged in a guard region that is a region surrounded by the outer periphery of the frame portion 20. That is, in a side view as viewed from the side frame 22 side, the battery pack 15 is arranged in a substantially triangle guard region formed of the side frame 22 and the bottom frame 24 as two sides of the triangle. That is, the battery pack 15 is located in a space protected by the frame portion 20. Accordingly, even if the projector 1 falls or drops, the battery pack 15 is protected by the frame portion 20, and an impact does not directly act on the battery pack 15. The battery pack 15 is a heavy component. Thus, if an impact directly acts on the battery pack 15, there is a high possibility that a mount mechanism of the battery holder 14 is damaged. Hence, in the projector 1, the battery pack 15 vulnerable to impacts is effectively protected by the side frames 22 and the bottom frames 24 of the frame portion 20, so that an impact does not directly act on the battery pack 15. Thus, durability of the projector 1 is improved. Further, as shown in FIG. 8A, in a state where the front surface of the main body portion 10 is provided is located at the front side (the left side in the drawing) of the support mechanism 21 constituting the side frame 22, the frame portion 20 is so configured that the first ground contact plane extends substantially in the frontward/rearward direction below the support mechanism 21 and that the second ground contact plane extends substantially in the vertical direction at the rear side of the support mechanism 21.

As shown in FIG. 8B, in a state where the projection direction is set to the front 45-degree obliquely upward, too, in a side view as viewed from the side frame 22 side, the battery pack 15 is arranged in a substantially triangle guard region having the side frame 22 and the bottom frame 24 as two sides of the triangle. Accordingly, even if the projector 1 falls or drops in the rotational range of FIGS. 8 A to B, the battery pack 15 is protected by the frame portion 20, and an impact does not directly act on the battery pack 15.

As shown in FIG. 8C, in a state where the projection direction is set to the front 45-degree obliquely downward, in a side view as viewed from the side frame 22 side, a large part of the rear side of the battery pack 15 is arranged in a substantially triangle guard region having the side frame 22 and the bottom frame 24 as two sides of the triangle. Accordingly, even if the projector 1 falls or drops in the rotational range shown in FIGS. 8 A to 8C, an impact from the rear side is protected by the frame portion 20, and does not directly act on the battery pack 15. Note that in a state where shown in FIG. 8C, a part of the battery pack 15 protrudes forward from the side frame 22, that is, the part of the battery pack 15 is exposed to the outside of the guard region. However, the cover member 13 and the housing 11 of the main body portion 10 protrude further outward than the battery pack 15. Hence, even if the projector 1 falls or drops to the front side, an impact first acts on the housing 11 and the cover member 13, and an impact does not directly act on the battery pack 15.

Figure 9A:
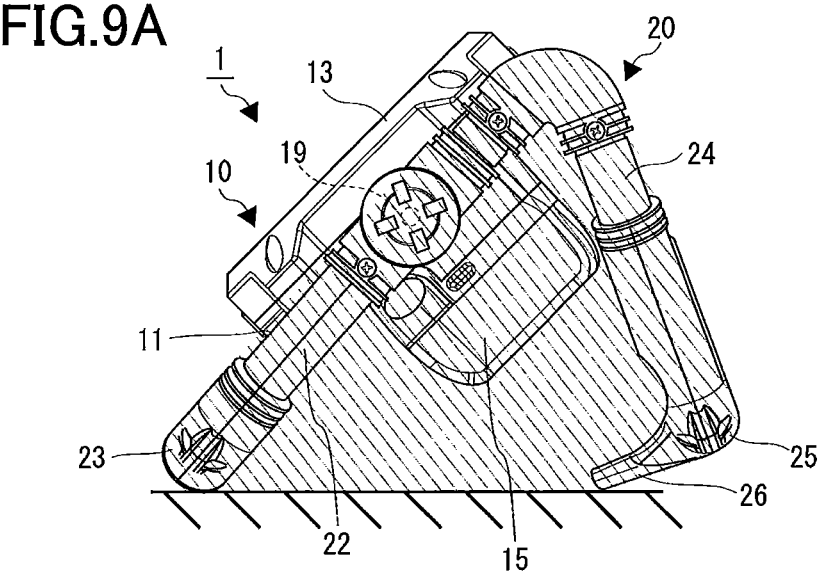
FIGS. 9A and 9B are side views of the projector projecting light upward.
Figure 9B:
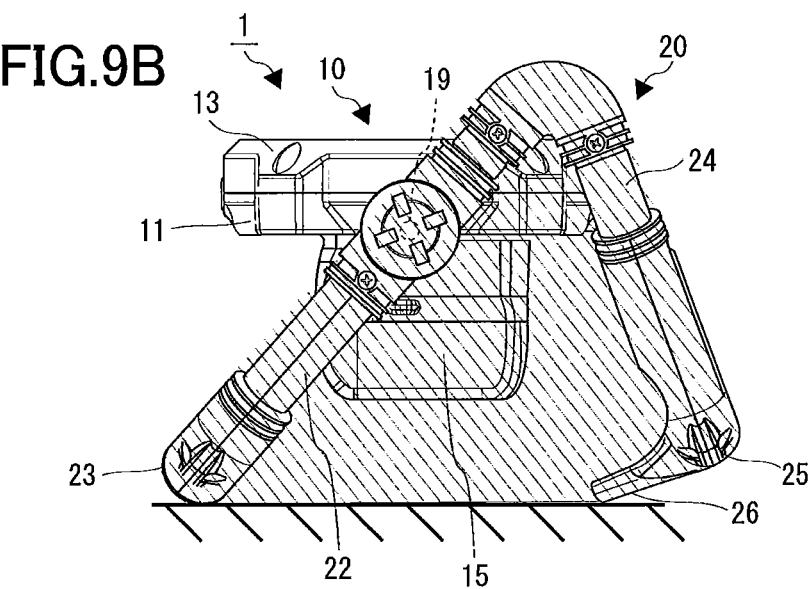

The setting of projection directions in upward projection from 45-degree obliquely upward to directly upward can be performed in a state where the top frame 23 and the claw portion 26 of the connection frame 25 are put on ground so that the projector 1 stands on its own. FIGS. 9A and 9B show states in which the top frame 23 and the claw portion 26 of the connection frame 25 are put on ground so that the projector 1 stands on its own. In FIG. 9A, the projector 1 is set such that the projection direction is oriented to the front 45-degree obliquely upward. In FIG. 9B, the projector 1 is set such that the projection direction is oriented to directly upward.

As shown in FIG. 9A, in a state where the projection direction is set to the front 45-degree obliquely upward, the front surface of the main body portion 10 is provided is located outside of the guard region, and the battery pack 15 is located inside the guard region. That is, in a side view as viewed from the side frame 22 side, the battery pack 15 is arranged in a substantially triangle guard region having the side frame 22 and the bottom frame 24 as two sides of the triangle. Accordingly, even if the projector 1 falls or drops in this state, the battery pack 15 is protected by the frame portion 20, and an impact does not directly act on the battery pack 15.

As shown in FIG. 9B, in a state where the projection direction is set to the directly upward, too, in a side view as viewed from the side frame 22 side, the battery pack 15 is arranged in a substantially triangle guard region having the side frame 22 and the bottom frame 24 as two sides of the triangle. Accordingly, even if the projector 1 falls or drops in the rotational range shown in FIGS. 9 A and 9B, the battery pack 15 is protected by the frame portion 20, and an impact does not directly act on the battery pack 15.

Figure 10A:
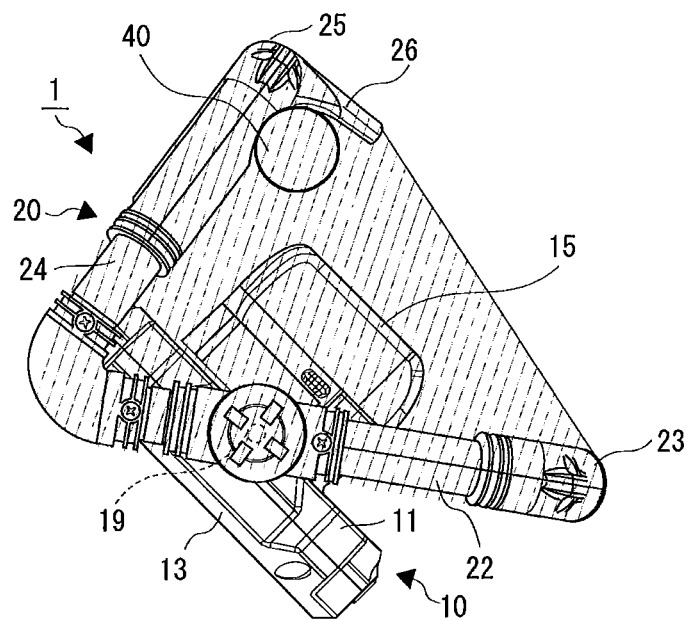
FIGS. 10A and 10B are side views of the projector projecting light projecting light downward.
Figure 10B:
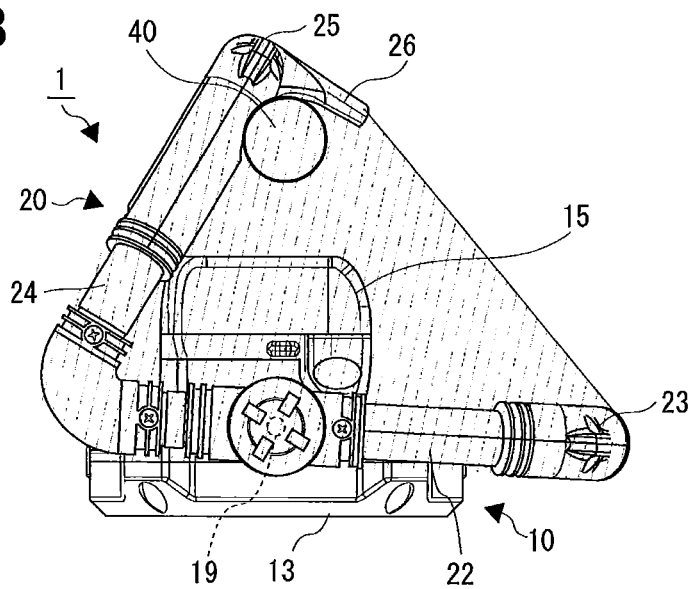

The setting of projection directions in downward projection from 45-degree obliquely downward to directly downward can be performed by using the projector 1 in a state where the projector 1 is hung from the tube pipe 40. FIG. 10 shows states in which the projector 1 is hung from the tube pipe 40. In FIG. 10A, the projector 1 is set such that the projection direction is oriented to the front 45-degree obliquely downward. In FIG. 10B, the projector 1 is set such that the projection direction is oriented to directly downward. The projector 1 is so configured that, in a state where the claw portion 26 is hooked on the tube pipe 40, both of the battery pack 15 and the tube pipe 40 are located inside the guard region surrounded by the outer periphery of the frame portion 20.

As shown in FIG. 10A, in a state where the projection direction is set to the front 45-degree obliquely downward, in a side view as viewed from the side frame 22 side, the battery pack 15 is arranged in a substantially triangle guard region having the side frame 22 and the bottom frame 24 as two sides of the triangle. Accordingly, even if the projector 1 falls or drops in this state, the battery pack 15 is protected by the frame portion 20, and an impact does not directly act on the battery pack 15.

As shown in FIG. 10B, in a state where the projection direction is set to the directly downward, too, in a side view as viewed from the side frame 22 side, the battery pack 15 is arranged in a substantially triangle guard region having the side frame 22 and the bottom frame 24 as two sides of the triangle. Accordingly, even if the projector 1 falls or drops in the rotational range of FIGS. 10 A to B, the battery pack 15 is protected by the frame portion 20, and an impact does not directly act on the battery pack 15.

As described above, when the projector 1 is used normally, in a side view as viewed from the side frame 22 side, an entirety or a large part of the battery pack 15 is arranged in a substantially triangle guard region having the side frame 22 and the bottom frame 24 as two sides of the triangle. Even if the main body portion 10 rotationally moves, the battery pack 15 protrudes to outside of the guard region only from the side frame 22; the battery pack 15 does not protrude to outside of the guard region from the bottom frame 24; and the battery pack 15 does not protrude the side connecting the upper end of the side frame 22 and the end of the bottom frame 24. Accordingly, even if the projector 1 falls or drops, an impact from the rear side is protected by the frame portion 20, and does not directly act on the battery pack 15. Further, in the rotational range of FIGS. 8 B to 8C, that is, in a rotational range of 45 degrees in the vertical direction of the main body portion 10 relative to a state where the bottom frame 24 is put on ground and the transparent plate 12 of the main body portion 10 is oriented vertically so that the projection direction is set horizontally to the front side, the protrusion amount of the housing 11 from the side frame 22 to outside of the guard region is always larger than the protrusion amount of the battery pack 15 from the side frame 22 to outside of the guard region. With this configuration, even if the projector 1 falls or drops to the front side, an impact first acts on the housing 11 and the cover member 13, and an impact does not directly act on the battery pack 15.

Alternatively, rotational movement of the main body portion 10 may be restricted to a range in which the protrusion amount of the housing 11 from the side frame 22 to outside of the guard region is larger than the protrusion amount of the battery pack 15 from the side frame 22 to outside of the guard region. With this configuration, the range of normal use of the projector 1 can be set so as to prevent damages due to an unexpected usage method.

Second Embodiment

Figure 11:
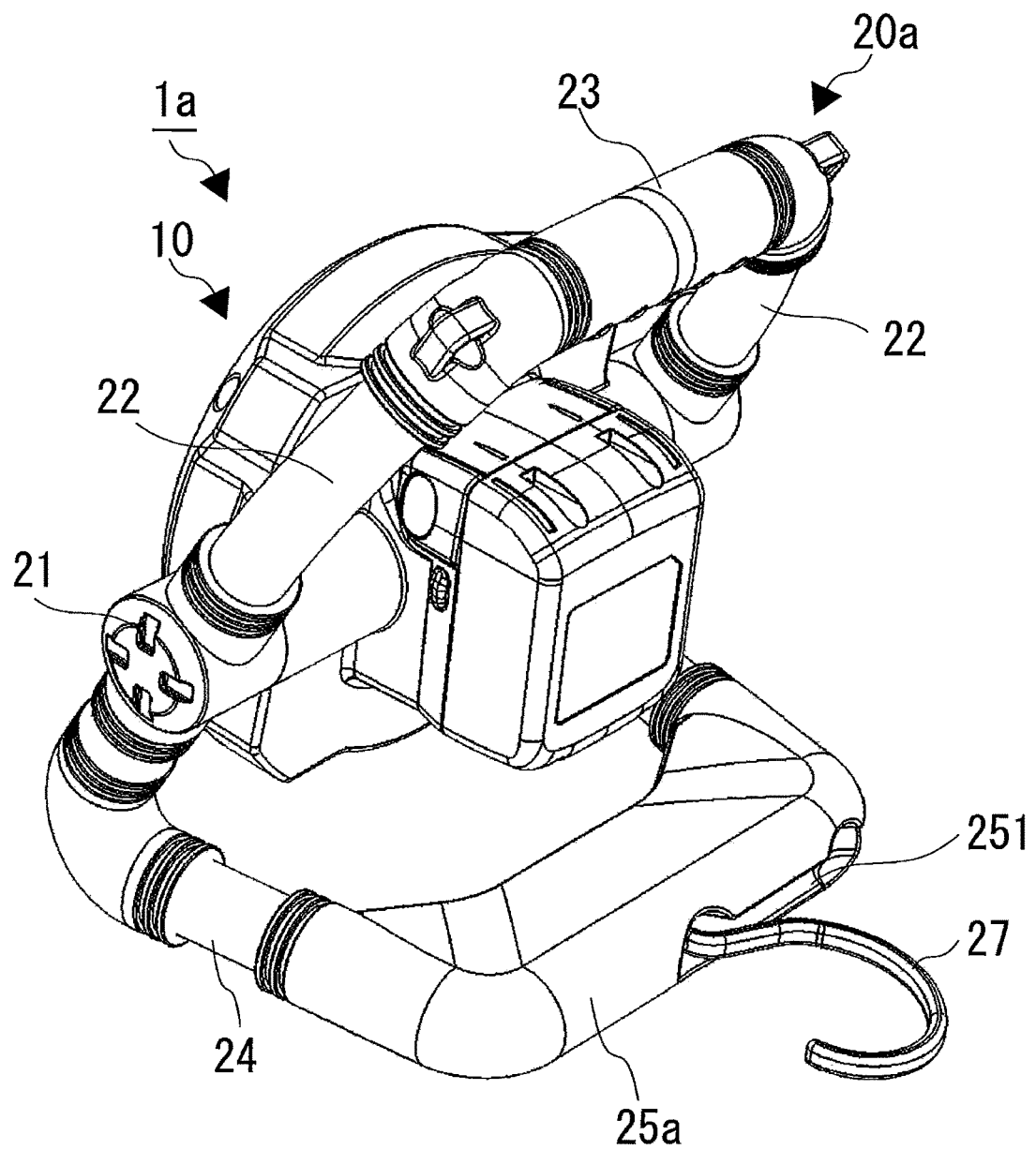
FIG. 11 is a perspective view of a projector according to a second embodiment of the present invention.

As shown in FIG. 11, a projector 1a of a second embodiment is different from the first embodiment in the configuration of a frame portion 20a. The frame portion 20a is provided with a hook 27 of which a base end is rotatably supported by a connection frame 25a. By hanging the hook 27 from the tube pipe 40 in a state where the orientation of the projector 1a is reversed upside down, the projector 1a can be used in a hung state. The connection frame 25a is formed with a stowing groove 251 in which the hook 27 is stowed. With this arrangement, in a state where the projector 1a is not hung, the hook 27 can be stowed in the stowing groove 251 of the connection frame 25a.

Third Embodiment

Figure 12:
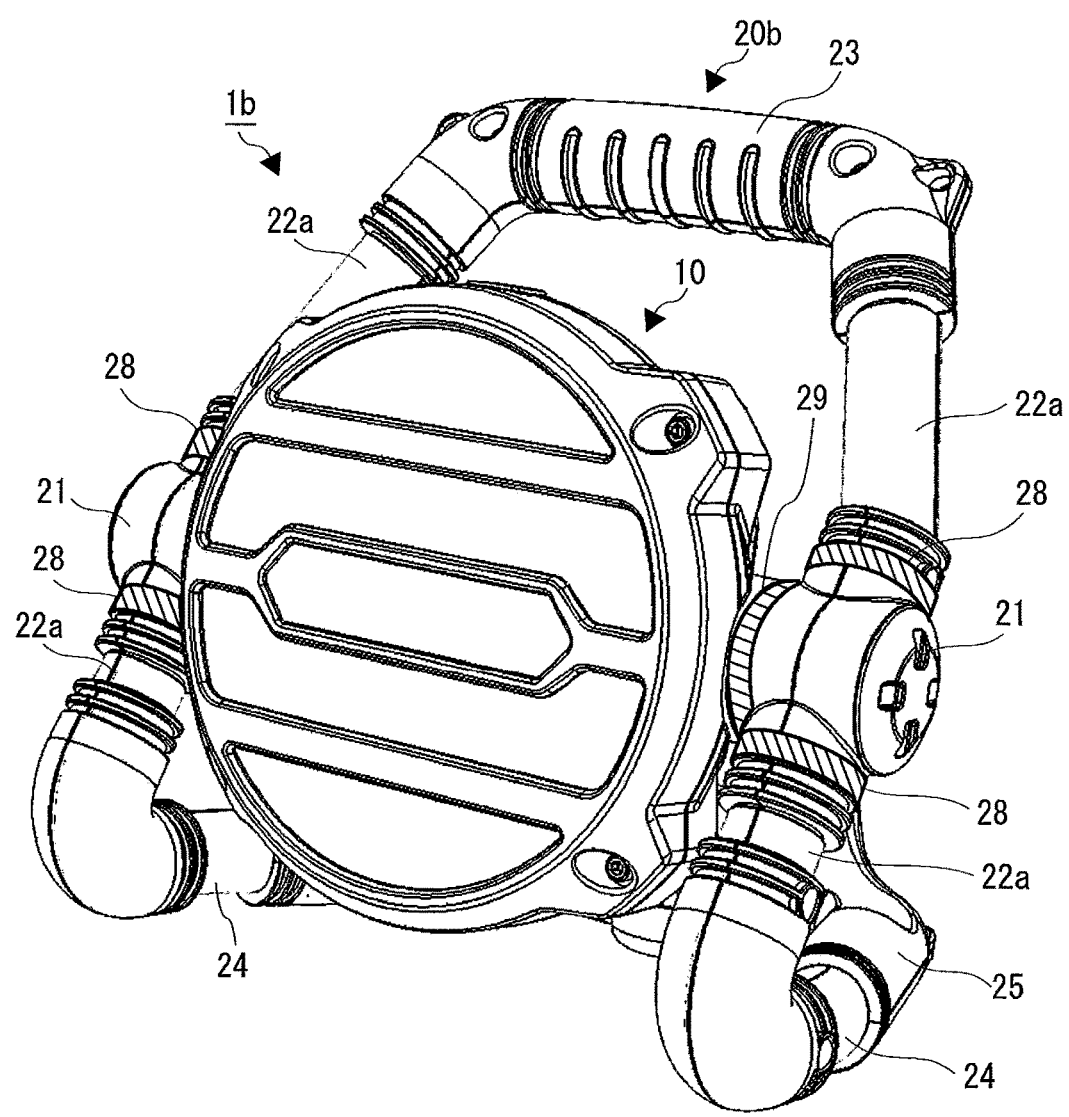
FIG. 12 is a perspective view of a projector according to a third embodiment of the present invention.

As shown in FIG. 12, a projector 1b of a third embodiment is different from the first embodiment in the configuration of a frame portion 20b. In side frames 22a, the support mechanism 21 built in a part of the side frame 22a is connected via elastic members 28, and also the main body portion 10 and the support mechanism 21 are connected to each other via an elastic member 29. Although, in the present embodiment, the elastic member 28 and the elastic member 29 are provided, only one of the elastic member 28 and the elastic member 29 may be provided.

The elastic members 28 and 29 are made of soft material, for example, that is molded by using soft resin. Because the elastic members 28 and 29 are provided, when an impact acts on the frame portion 20b at the time of a fall or a drop, the impact that acts on the frame portion 20b is mitigated by the elastic members 28, and then transmitted to the main body portion 10. Accordingly, an impact that acts on the main body portion 10 can be reduced, and the projector 1b having higher durability can be provided.

Figure 13A:
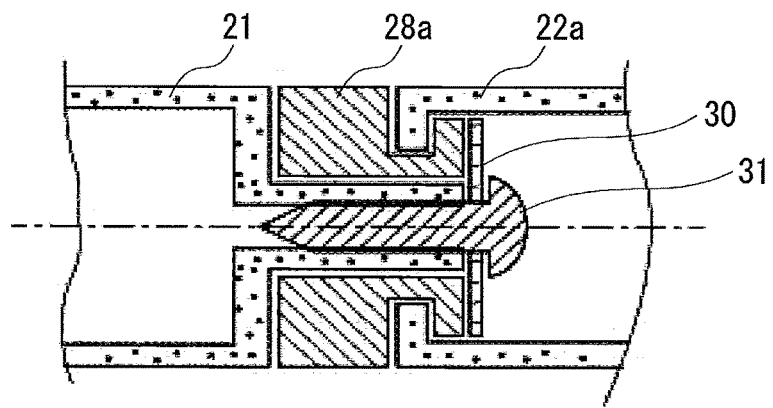
FIGS. 13A to 13C are schematic views explaining examples of connections of resilient material and frames of the projector according to the third embodiment.

FIG. 13A shows an example of a mount structure of an elastic member 28a. The elastic member 28a has a through hole and is made of soft resin such as rubber. The elastic member 28a is arranged between the support mechanism 21 and the side frame 22a that are made of hard resin, and is fitted in an opening formed in the side frame 22a. And, a boss formed at the support mechanism 21 is inserted into the through hole of the elastic member 28a, and the support mechanism 21 and the elastic member 28a are fixed by a tapping screw 31 from the side frame 22a side with a washer 30 interposed therebetween. Thus, the support mechanism 21 is connected to the side frame 22a via the elastic member 28a. Alternatively, an opening may be formed at the support mechanism 21, and a boss may be provided at the side frame 22a.

Figure 13B:
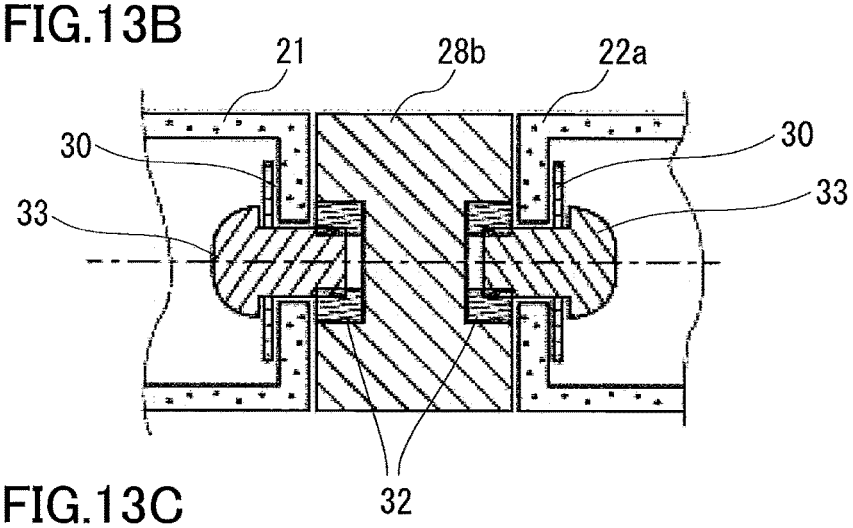

FIG. 13B shows another example of a mount structure of an elastic member 28b. The elastic member 28b is made from soft resin such as rubber, and molded with nuts 32 inside thereof. The support mechanism 21 and the side frame 22a made of hard resin are combined to the elastic member 28b by mechanical screws 33 with washers 30 interposed therebetween. With this arrangement, the support mechanism 21 is connected to the side frame 22a via the elastic member 28b.

Figure 13C:
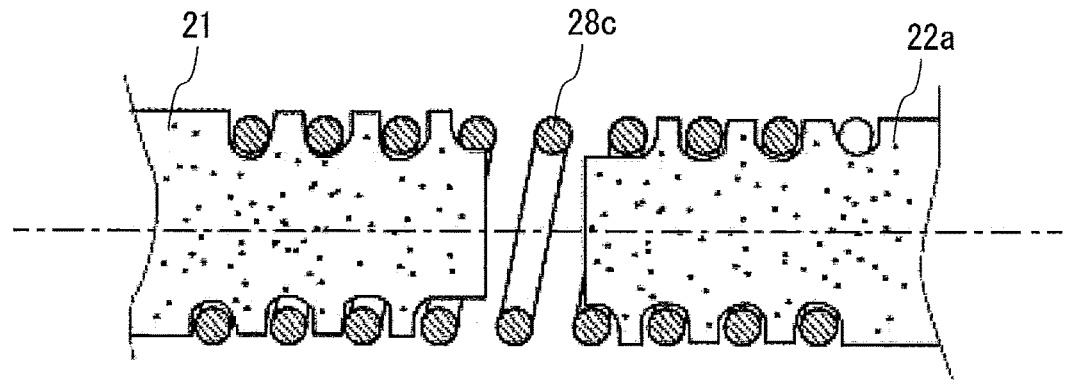

FIG. 13C shows another example of a mount structure of an elastic member 28c. The elastic member 28c is a spring that has an elastic body. The elastic member 28c is fitted to each of the support mechanism 21 and the side frame 22a made of hard resin, while keeping a space therebetween. With this arrangement, the support mechanism 21 is connected to the side frame 22a via the elastic member 28c.

Fourth Embodiment

Figure 14:
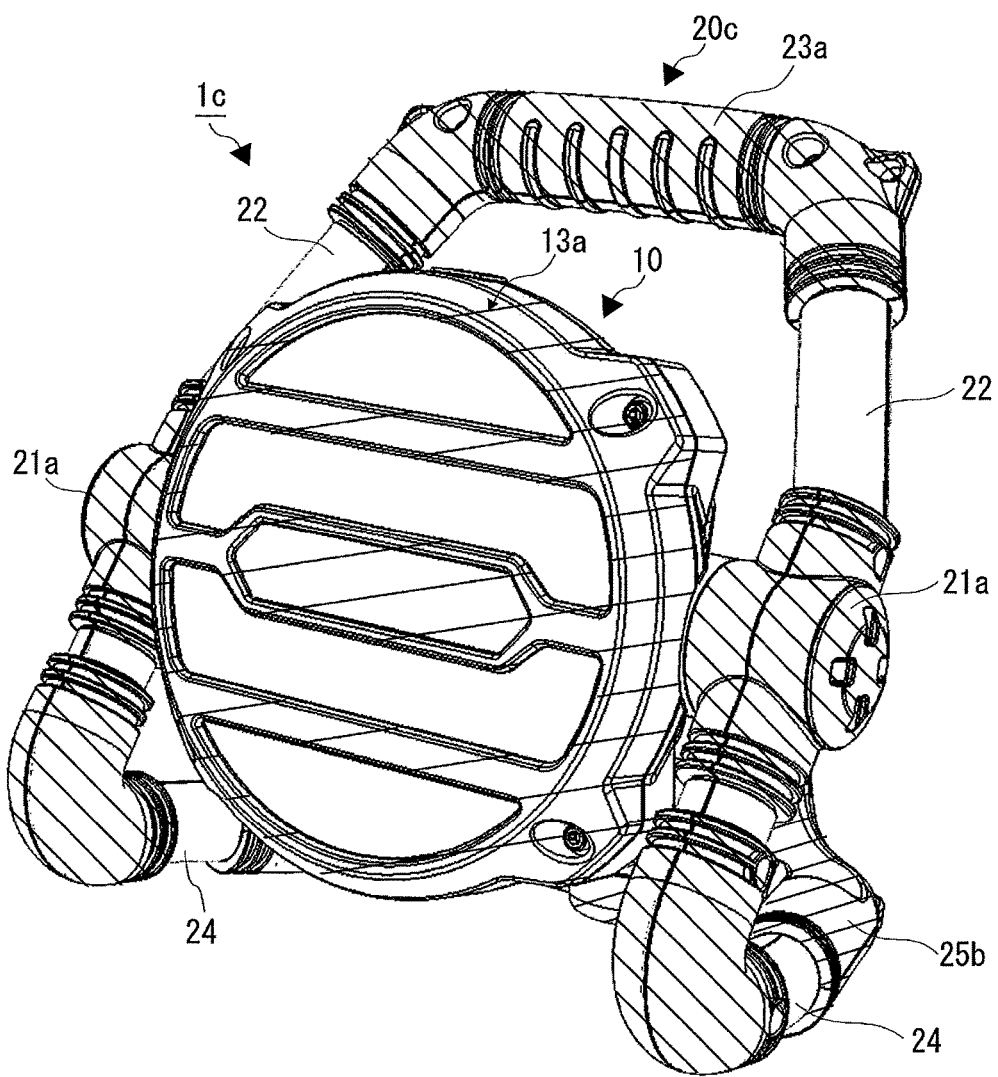
FIG. 14 is a perspective view of a projector according to a fourth embodiment of the present invention.

As shown in FIG. 14, a projector 1c of a fourth embodiment is different from the first embodiment in the configuration of a cover member 13a and a frame portion 20c. In the fourth embodiment, the outer shell of all or part of the cover member 13a and the frame portion 20c is made of soft material such as rubber. For example, the outer shell may be made of soft material by a two-layer resin molding using elastomer. In the example shown in FIG. 14, as shown in the hatching lines, the outer shells of the cover member 13a and parts of the frame portion 20c (the top frame 23a, connection portions of the side frames 22 and the bottom frames 24, and the connection frame 25b) are made of soft material. With this configuration, because soft material is provided at the outer shell of the cover member 13a and the frame portion 20c, an impact due to a drop and the like can be mitigated by soft material, and an impact transmitted to the main body portion 10 (the battery pack 15) can be reduced. Hence, the projector 1c having higher durability can be provided.

Fifth Embodiment

Figure 15A:
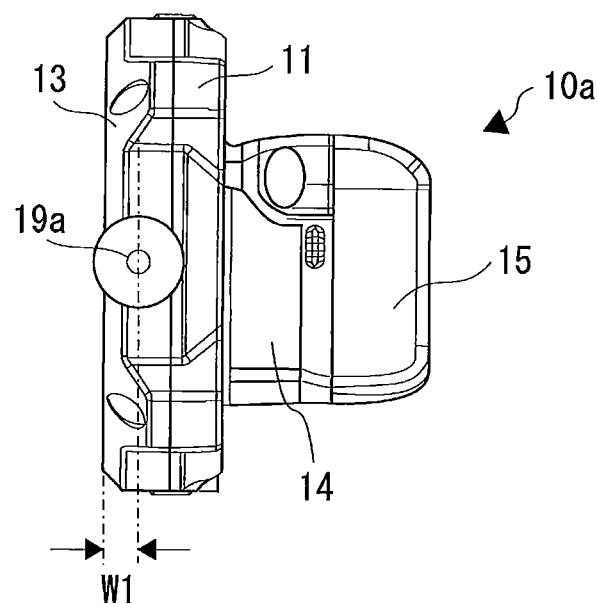
FIGS. 15A and 15B are side views of a projector according to a fifth embodiment of the present invention.
Figure 15B:
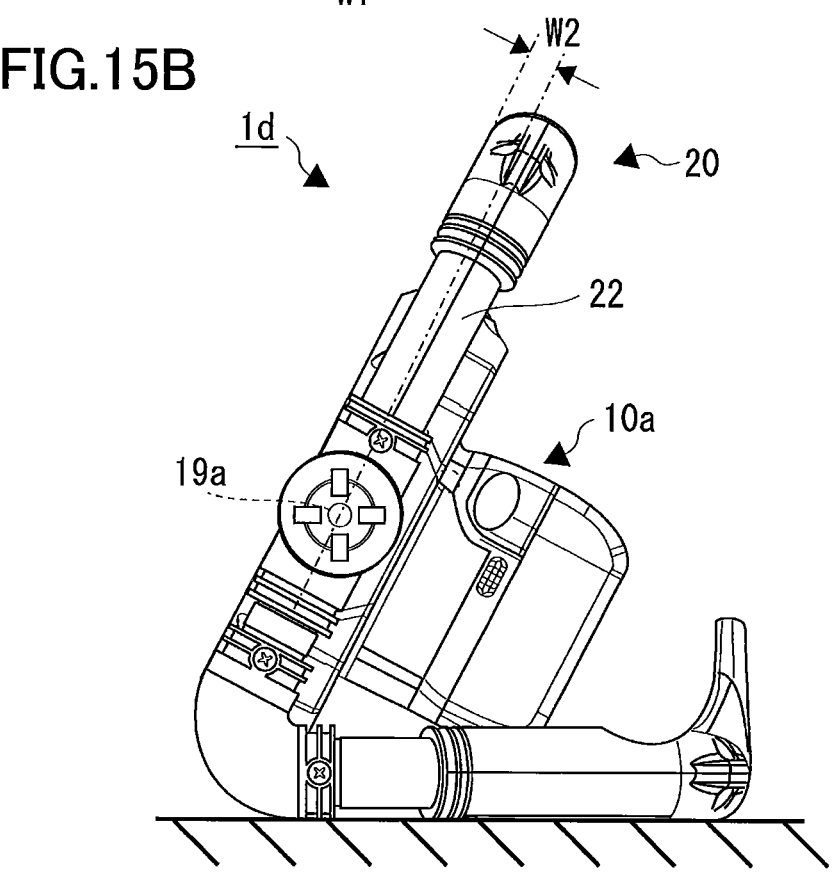

As shown in FIG. 15, a projector 1d of a fifth embodiment is different from the first embodiment in the configuration of a main body portion 10a. A shortest distance W1 from the foremost surface of the housing 11 (the cover member 13) to a rotational shaft 19a shown in FIG. 15A is shorter than a shortest distance W2 from the foremost surface of the side frame 22 to the rotational shaft 19a shown in FIG. 15B. With this configuration, when the projection direction is set to a direction perpendicular to the side frame 22 as shown in FIG. 15B, the main body portion 10a does not protrude from the front surface of the side frame 22. Accordingly, when the projector 1d drops from the front surface side onto a flat surface such as the ground surface, the frame portion 20 first receives an impact prior to the main body portion 10a. Hence, an impact does not directly act on the main body portion 10a (the battery pack 15), and the projector 1d having higher durability can be provided. Even if the main body portion 10a in a state where the main body portion 10a makes a protuberant portion from the front surface side of the side frame 22, the main body portion 10a can rotatably move about the rotational shaft 19a to retract the protuberant portion in the side frames 22. Thus, an impact can be mitigated.

As described above, the electrical apparatus (the projector 1) of the present embodiment includes the main body portion 10 having a converting portion (the LEDs 2) that converts electric power to one of light, wind, heat, and sound, and having an outputting portion (the transparent plate 12) that outputs the one of light, wind, heat, and sound outputted from the converting portion to the outside, the battery pack 15 detachably mounted at the battery holder 14 provided at the main body portion 10 and supplying the converting portion with electric power, and the frame portion 20 that rotatably supports the main body portion 10. A first ground contact plane and a second ground contact plane are provided at the frame portion 20. The first ground contact plane (the ground contact plane defined by the pair of bottom frames 24) can contact a ground surface. The second ground contact plane (the ground contact plane defined by the top frame 23 and the claw portion 26 of the connection frame 25) can contact a ground surface at an angle different from an angle of the first ground contact plane. The projector 1 is so configured that, when any one of the first ground contact plane and the second ground contact plane contacts the ground surface, the main body portion 10 and the battery pack 15 can rotatably move relative to the frame portion 20 without contacting the ground surface.

With this configuration, the projector 1 is compact and lightweight, has the self-standing mechanism and the support mechanism 21, and has durability for withstanding impacts such as a drop. The projector 1 can output light, wind, heat, or sound in various directions by switching the ground contact plane that contacts a ground surface.

Further, according to the present embodiment, the frame portion 20 is provided with the support mechanism 21 that rotatably supports the main body portion 10. In a state where the outputting portion (the transparent plate 12) is located at the front side of the support mechanism 21, the frame portion 20 is so configured that the first ground contact plane extends substantially in the front-rear direction below the support mechanism 21, and that the second ground contact plane extends substantially in the vertical direction at the rear side of the support mechanism 21.

With this configuration, the outputting portion faces forward when the first ground contact plane contacts the ground surface, and the outputting portion faces upward when the second ground contact plane contacts the ground surface. Thus, light, wind, heat, or sound can be outputted in various directions.

Further, according to the present embodiment, the battery pack 15 is arranged inside the guard region that is a region surrounded by the outer periphery of the frame portion 20.

With this configuration, the electrical apparatus (the projector 1) is compact and lightweight, includes the self-standing mechanism and the support mechanism 21, and has durability for bearing impacts such as a drop. When the electrical apparatus (the projector 1) drops on the ground surface, the frame portion 20 directly hits the ground surface, which can prevent the battery pack 15 from directly hitting the ground surface. Thus, damages to the battery pack 15 and the battery holder 14 can be prevented.

Further, according to the present embodiment, in a state where the outputting portion (the transparent plate 12) is located outside of the guard region that is a region surrounded by the outer periphery of the frame portion 20, the battery pack 15 is located inside of the guard region.

With this configuration, the electrical apparatus (the projector 1) is compact and lightweight, includes the self-standing mechanism and the support mechanism 21, and has durability for bearing impacts such as a drop. Further, while keeping light, wind, heat, or sound outputted from the outputting portion (the transparent plate 12) from being blocked by the frame portion 20, damages to the battery pack 15 and the battery holder 14 can be prevented at the time of a drop.

Further, according to the present embodiment, in a state where a part of the battery pack 15 is exposed to outside of the guard region that is a region surrounded by the outer periphery of the frame portion 20, the main body portion 10 protrudes further outward than the battery pack 15.

With this configuration, the electrical apparatus (the projector 1) is compact and lightweight, includes the self-standing mechanism and the support mechanism 21, and has durability for bearing impacts such as a drop. Further, if the electrical apparatus (the projector 1) drops in a state where the main body portion 10 is rotatably moved greatly, the main body portion 10 hits directly the ground surface before the battery pack 15. Thus, while increasing the rotatable range of the main body portion 10, damages to the battery pack 15 and the battery holder 14 can be prevented.

Further, according to the present embodiment, the frame portion 20 includes the side frames 22 located the left and right sides of the outputting portion, the top frame 23 located above the outputting portion, and the bottom frame 24 located below the outputting portion, when the outputting portion is viewed from the front side in a state where the outputting portion (the transparent plate 12) faces forward. And, the frame portion 20 is made by integrating the side frames 22, the top frame 23, and the bottom frame 24, so that the frames 22, 23, and 24 do not move relative to one another. Also, the frame portion 20 is provided with the support mechanism 21 that rotatably supports the main body portion 10.

With this configuration, the electrical apparatus (the projector 1) is compact and lightweight, includes the self-standing mechanism and the support mechanism 21, and has durability for bearing impacts such as a drop. Further, when construction material such as wood drops from upward or left and right directions of the electrical apparatus (the projector 1), the construction material first hits the frame portion 20 directly. This prevents the main body portion 10 and the support mechanism 21 from being damaged due to the construction material.

Further, according to the present embodiment, the electrical apparatus (the projector 1) includes the main body portion 10 provided with the housing 11 having, at the front side, the transparent plate 12 that is the projection surface of light emitted from the built-in LEDs 2, and with the battery pack 15 that is a battery mounted at the rear side of the housing 11. The frame portion 20 includes the pair of side frames 22 that protects the side surfaces of the main body portion 10, the support mechanism 21 that rotatably supports the main body portion 10 with the rotational shafts 19 substantially perpendicular to the side frames 22, and the pair of bottom frames 24 that extend rearward from the lower ends of the pair of side frames 22 to serve as the foot portion. In a state where the bottom frames 24 are put on ground and where the transparent plate 12 of the main body portion 10 is oriented vertically so that the projection direction is set horizontally toward the front side, in a side view as viewed from the side frame 22 side, the battery pack 15 is arranged in a substantially triangle guard region having the side frame 22 and the bottom frame 24 as two sides of the triangle.

With this configuration, the battery pack 15 vulnerable to impacts can be effectively protected by the side frames 22 and the bottom frames 24, without adding a extra shape. This can realize the projector 1 that is compact and lightweight, includes the self-standing mechanism and the support mechanism 21, and also has durability for bearing impacts such as a drop.

Further, according to the present embodiment, when the main body portion 10 is rotationally moved, the battery pack 15 protrudes to outside of the guard region only from the side frame 22 side.

With this configuration, even when the main body portion 10 is rotationally moved, the battery pack 15 does not protrude from the bottom frames 24 or from the side that connects the upper ends of the side frames 22 and the rear ends of the bottom frames 24. Accordingly, impacts from the rear side and the bottom frame 24 side are protected by the side frames 22 and the bottom frames 24, and do not directly act on the battery pack 15. Thus, the durability of the projector 1 improves.

Further, according to the present embodiment, in a rotational range of 45 degrees in the vertical direction of the main body portion 10 relative to a state where the bottom frame 24 is put on ground and the transparent plate 12 of the main body portion 10 is oriented vertically so that the projection direction is set horizontally to the front side, a protrusion amount of the housing 11 from the side frame 22 side to outside of the guard region is always larger than a protrusion amount of the battery pack 15 from the side frame 22 side to outside of the guard region.

With this configuration, in a range of normal use, an impact from the front surface first acts on the housing 11 and does not directly act on the battery pack 15. Thus, durability of the projector 1 improves.

Further, according to the present embodiment, rotational movement of the main body portion 10 may be restricted to a range in which the protrusion amount of the housing 11 from the side frame 22 side to outside of the guard region is larger than the protrusion amount of the battery pack 15 from the side frame 22 side to outside of the guard region.

With this configuration, the range of normal use of the projector 1 can be set so as to prevent damages due to an unexpected usage method.

Further, according to the present embodiment, the top frame 23 connecting the upper ends of the pair of side frames 22 is provided.

With this configuration, the side frames 22 can be strengthened, and the top frame 23 can function as a handle for carrying the projector 1.

Further, according to the present embodiment, the connection frame 25 connecting rear ends of the pair of bottom frames 24 is provided.

With this configuration, the bottom frames 24 can be strengthened.

Further, according to the present embodiment, the support mechanism 21 is integrated in the side frame 22.

With this configuration, the support mechanism 21 can function as the side frame 22 that protects the main body portion 10. Thus, the number of parts can be reduced, and the projector 1 can be made compact and lightweight.

Further, according to the present embodiment, soft material is used in all or part of the side frames 22 and the bottom frames 24.

With this configuration, an impact acting on the side frames 22 and the bottom frames 24 can be mitigated by the soft material, and an impact transmitted to the main body portion 10 (the battery pack 15) can be reduced. Hence, the projector 1c having a higher durability can be provided.

Further, according to the present embodiment, the shortest distance W1 from the foremost surface of the housing 11 (the cover member 13) to the rotational shaft 19a is shorter than the shortest distance W2 from the foremost surface of the side frame 22 to the rotational shaft 19a.

With this configuration, when the projection direction is set to a direction perpendicular to the side frame 22, the main body portion 10a does not protrude from the front surface side of the side frame 22. When the projector 1d drops from the front surface side onto a flat surface such as a ground surface, the frame portion 20 first receives an impact prior to the main body portion 10a. Hence, an impact does not directly act on the main body portion 10a (the battery pack 15), and the projector 1d having higher durability can be provided.

Further, according to the present embodiment, the electrical apparatus (the projector 1) includes the main body portion 10 provided with the housing 11 having, at the front side, the transparent plate 12 that is the projection surface of light emitted from the built-in LEDs 2, and with the battery pack 15 that is a battery mounted at the rear side of the housing 11. The frame portion 20 includes the pair of side frames 22 in which the support mechanisms 21 for rotatably supporting the main body portion 10 are integrated, and the pair of bottom frames 24 that extend rearward from the lower ends of the pair of side frames 22. The tripod hole 3 is formed in the lower surface of the housing 11, which is a part other than the side surfaces of the housing 11.

With this configuration, the main body portion 10 can be supported by a tripod without detaching the frame portion 20 from the main body portion 10.

While the invention has been described in detail with reference to the above aspects thereof, it would be apparent to those skilled in the art that various changes and modifications may be made therein without departing from the scope of the claims.

For example, the invention can be applied to an electrical apparatus that converts electric power to one of light, wind, heat, and sound and that outputs the same to the outside.

The electrical apparatus that converts electric power to light and that outputs the light is not limited to the projectors 1, 1a, 1b, 1c, and 1d. By using liquid crystal as the converting portion for converting electric power to light and by using a liquid crystal panel as the outputting portion for outputting the converted light to the outside, the invention can be applied to a video player such as a television and a DVD player.

As an electrical apparatus that converts electric power to wind and that outputs the wind, by using a fan as the converting portion for converting electric power to wind and by using a guard net of the fan as the outputting portion for outputting the converted wind to the outside, the invention can be applied to a blower such as an electric fan and a cooler.

As an electrical apparatus that converts electric power to heat and that outputs the heat, by using a heat converter as the converting portion for converting electric power to heat and by using a guard net of the heat converter as the outputting portion for outputting the converted heat to the outside, the invention can be applied to a heat converter such as a heater and a cooler.

As an electrical apparatus that converts electric power to sound and that outputs the sound, by using a speaker as the converting portion for converting electric power to sound and by using a dust prevention net of the speaker as the outputting portion for outputting the converted sound to the outside, the invention can be applied to an audio equipment such as a speaker, a loudspeaker, and a radio.

According to the present embodiment, by merely hanging a claw portion serving as a hook from a tube pipe, the output direction of light, wind, heat, or sound can be fixed at a direction intersecting the tube pipe. Further, according to the present embodiment, the hook is provided at a connection frame different from a top frame that functions as a handle. Thus, the hook does not get in the way when the electrical apparatus is carried.

In view of the foregoing, the invention provides a projector so configured that, even if the guard member is attached to the front side of the projection surface, a shadow due to the guard member is not formed when light is projected, which allows work to be done comfortably.

As described above, according to the present embodiment, the electrical apparatus (the projector 1) includes the main body portion 10 and the frame portion 20. The main body portion 10 has the converting portion (the LEDs 2) that converts electric power to one of light, wind, heat, and sound, and the outputting portion (the transparent plate 12) that outputs one of light, wind, heat, and sound outputted from the converting portion to the outside. The frame portion 20 rotatably supports the main body portion 10. The first ground contact plane (the ground contact surface defined by the pair of bottom frames 24) that can contact a ground surface is provided at the frame portion 20. The outputting portion (the transparent plate 12) is disposed at a forward part of the first ground contact plane, and the claw portion 26 is provided at a rearward part of the first ground contact plane.

With this configuration, by merely hooking the claw portion 26 on the tube pipe 40, the output direction can be fixed at a direction intersecting the tube pipe. That is, light, wind, heat, or sound can be outputted forward by setting the electrical apparatus such that the first ground contact plane contacts the ground surface. Also, light, wind, heat, or sound can be outputted to the lower side by setting the electrical apparatus such that the claw portion 26 is hooked on a tube pipe etc. positioned over the head of an operator and the output direction is fixed.

Further, according to the present embodiment, the frame portion 20 is provided with the support mechanism 21 that rotatably supports the main body portion 10. The outputting portion (the transparent plate 12) is disposed at the front side of the support mechanism 21. The battery pack 15 is mounted on the main body portion 10 at the rear side of the support mechanism 21.

With this configuration, a combined center of gravity obtained by combining the center of gravity of the main body portion 10 and the center of gravity of the battery pack 15 is located near the support mechanism 21. When the main body portion 10 and the battery pack 15 are rotationally moved relative to the frame portion 20, movement of the combined center of gravity of the entire electrical apparatus (the projector 1) can be reduced to a small amount. Thus, even if the main body portion 10 and the battery pack 15 are rotationally moved relative to the frame portion 20 in a state where the claw portion 26 is hooked on the tube pipe 40, hooking of the claw portion 26 and the tube pipe 40 does not easily come off.

Further, according to the present embodiment, the frame portion 20 is provided with the claw portion 26. In a state where the claw portion 26 is hooked on the tube pipe 40, both of the battery pack 15 and the tube pipe 40 are located inside the guard region surrounded by the outer periphery of the frame portion 20.

With this configuration, by merely hooking the claw portion 26 on the tube pipe 40, the output direction can be fixed, and the guard region for protecting the battery pack 15 can also be used as a space for positioning the tube pipe 40 in a hung state, so that the space can be saved.

Further, according to the present embodiment, the main body portion 10 is rotatably connected to the frame portion 10 such that the main body portion 10 is rotatably movable about the rotational shafts 19 extending in the left-right direction of the main body portion 10. Also, the frame portion is provided with the claw portion 26, and the claw portion 26 can be moved in the left-right direction relative to the tube pipe 40 in a state where the claw portion 26 is hooked on the tube pipe 40.

With this configuration, by merely hooking the claw portion 26 on the tube pipe 40, the output direction can be fixed. And, by rotationally moving the main body portion 40 in a state where the claw portion 26 is hooked on the tube pipe 40, a direction in which light, wind, heat, or sound is outputted can be moved vertically. Further, by moving the claw portion 26 in the left-right direction relative to the tube pipe 40, the direction in which light, wind, heat, or sound is outputted can be moved in the left-right direction. When work is done at an external wall of a building, the tube pipes 40 are assembled along the external wall to make scaffolding. With the electrical apparatus (the projector 1) configured in this way, while keeping a state in which the electrical apparatus is hung from the tube pipe 40, the direction in which light, wind, heat, or sound is outputted can be moved vertically and in the left-right direction along an external wall, which is convenient for works such as painting and repairing of the external wall.

Further, according to the present embodiment, the electrical apparatus (the projector 1) includes the main body portion 10 having, at the front side, the projection surface of light emitted from the built-in LEDs 2, and the frame portion 20 that protects the main body portion 10. The surface of the frame portion 20 confronting the main body portion 10 has the claw portion 26 formed with the concave portion 26a that extends in a direction substantially perpendicular to the projection direction.

With this configuration, by merely hooking the claw portion 26 serving as the hook on the tube pipe 40, the tube pipe 40 contacts the concave portion 26a, and the projection direction is fixed to a direction intersecting the tube pipe.

Further, according to the present embodiment, the electrical apparatus (the projector 1) includes the support mechanism 21 that rotatably supports the main body portion 10 with the rotational shafts 19 substantially parallel to a direction in which the concave portion 26a is formed.

With this configuration, the projection direction can be moved in a state where the electrical apparatus is hung from the tube pipe 40.

Further, according to the present embodiment, the concave portion 26a is formed with a partially cylindrical curved surface of which the axial direction is substantially perpendicular to the projection direction.

With this configuration, the claw portion 26 can be hooked on the tube pipe 40 easily.

Further, according to the present embodiment, the concave portion 26a is formed with the partially cylindrical curved surface of which the axial direction is substantially perpendicular to the projection direction. Assuming that the curvature radius of the concave portion 26a is R, the claw portion 26 is located at a position separated from the rotational movement region of the main body portion 10 by a distance larger than or equal to at least 2R.

With this configuration, even if the projection direction is moved by rotatably moving the main body portion 10 in a state hung from the tube pipe 40, the main body portion 10 does not contact the tube pipe 40. Hence, the projection direction can be moved in a broad range.

Further, according to the present embodiment, the main body portion 10 includes the housing 11 having, at the front side, the projection surface of light emitted from the built-in LEDs 2, and the battery pack 15 mounted at the rear side of the housing 11. The rotational shafts 19 are provided between the housing 11 and the battery pack 15.

With this configuration, even if the projection direction is moved by rotatably moving the main body portion 10, there is little movement of the center of gravity, and the electrical apparatus can be hung from the tube pipe 40 stably. Further, according to the present embodiment, the main body portion 10 includes the housing 11 having, at the front side, the projection surface of light emitted from the built-in LEDs, the pair of side frames 22 that protects the side surfaces of the main body portion 10, the pair of bottom frames 24 that extends rearward from lower ends of the pair of side frames 22 and that serves as the foot portions, the top frame 23 that connects the pair of side frames 22, the connection frame 25 that connects the pair of bottom frames 24, and the hook (the claw portion 26, the hook 27) provided at the connection frame.

With this configuration, the hook (the claw portion 26, the hook 27) is provided at the connection frame 25 different from the top frame 23 that functions as the handle. Thus, the hook (the claw portion 26, the hook 27) does not get in the way when the electrical apparatus is carried.

According to the invention, a cover member is provided by avoiding a projection region in the projection surface of LED serving as a light source. Hence, the invention has an advantageous effect that, even if the guard member is attached to the front side of the projection surface, a shadow due to the guard member is not formed when light is projected, which allows work to be done comfortably.

As described above, according to the present embodiment, the projector 1 includes the main body portion 10 having the housing 11 in which the LEDs 2 are provided and the battery pack 15 (serving as a battery) mounted at the rear side of the housing 11. The projector 1 includes the print circuit board 17, the transparent plate 12, and the cover member 13 (the bumper portion 132). The plurality of LEDs 2 is mounted on the print circuit board 17. The print circuit board 17 is accommodated in the housing 11 such that the mount surface of the LEDs 2 faces toward the front side. The transparent plate 12 is disposed to confront the mount surface of the LEDs 2 of the print circuit board 17, and serves as the projection surface of light emitted from the LEDs 2. The cover member 13 (the bumper portion 132) bridges over the projection surface while avoiding the projection region of the LEDs 2 in the projection surface.

With this configuration, the cover member 13 is provided to avoid the projection region, in the projection surface, of the LEDs 2 serving as the light source. Thus, there is an advantageous effect that, even if the bumper portion 132 is provided on the projection surface, a shadow due to the bumper portion 132 is not formed when light is projected, which allows work to be done comfortably.

Further, according to the present embodiment, a plurality of LED arrays is arranged and, in each of the LED arrays, a plurality of LEDs 2 is arranged. The bumper portions 132 bridge over the projection surface so as to be positioned between the LED arrays. Assuming that the diameter of the projection region of the LEDs 2 in the projection surface is La, the LED arrays are arranged with an interval larger than La therebetween.

With this configuration, the bumper portions 132 of bar-shaped members efficiently bridge over the projection surface, and the projection surface of the LEDs 2 can be covered effectively.

Further, according to the present embodiment, the cover member 13 includes the fringe portion 131 disposed at the periphery of the projection surface.

With this configuration, the periphery of the projection surface can also be covered.

Further, according to the present embodiment, the frame portion 20 includes the pair of side frames 22 that protects the side surfaces of the main body portion 10, the support mechanism 21 that rotatably supports the main body portion 10 with the rotational shafts 19 substantially perpendicular to the side frames 22, and the pair of bottom frames 24 that extend rearward from the lower ends of the pair of side frames 22 to serve as the foot portion. When the main body portion 10 rotationally moves, the battery pack 15 protrudes to outside of the guard region only from the side frame 22 side.

With this configuration, even if the main body portion 10 rotationally moves, the battery pack 15 does not protrude to outside of the guard region from the bottom frame 24 side or from a side connecting the upper end of the side frame 22 and the end of the bottom frame 24. Accordingly, an impact from the rear side and an impact from the bottom frame 24 side are protected by the side frame 22 and the bottom frame 24, and an impact from the front side is protected by the cover member 13. Hence, an impact does not directly act on the battery pack 15, and the durability of the projector 1 is improved.

While the present invention has been described in detail with reference to the embodiments thereof, it would be apparent to those skilled in the art that various changes and modifications may be made therein without departing from the spirit of the invention.

What is claimed is:

1. A projector comprising:
  a main body portion comprising:
    a housing having a projection surface of light emitted from a built-in light source at a front side; and
    a battery mounted at a rear side of the housing;
  a pair of side frames protecting side surfaces of the main body portion;
  a support mechanism rotatably supporting the main body portion with a rotational shaft substantially perpendicular to the pair of side frames; and
  a pair of bottom frames extending rearward from lower ends of the pair of side frames thereby serving as a foot portion, and defining a guard region that is a substantially triangle shape, the guard region having one of the pair of side frames and one of the pair of bottom frames as two sides of the triangle, the battery being arranged in the guard region when viewed from one of the pair of side frames in a state where the pair of bottom frames is put on ground and the projection surface of the main body portion is oriented vertically so that a projection direction is set horizontally to a front side.

2. The projector according to claim 1, wherein, when the main body portion is rotationally moved, the battery protrudes outside of the guard region only from the pair of side frame.

3. The projector according to claim 2, wherein, the housing has a protrusion amount from the pair of side frame to outside of the guard region, the protrusion amount being always larger than that of the battery from the pair of side frame to outside of the guard region when a rotational range of the main body portion is within 45 degrees relative to a state where the pair of bottom frames is put on ground and the projection surface of the main body portion is oriented vertically so that a projection direction is set horizontally to the front side.

4. The projector according to claim 3, wherein a rotational movement of the main body portion is restricted to a range in which the protrusion amount of the housing from the pair of side frame to outside of the guard region is larger than that of the battery from the pair of side frame to outside of the guard region.

5. The projector according to claim 1, further comprising a top frame that connects upper ends of the pair of side frames.

6. The projector according to claim 1, further comprising a connection frame that connects rear ends of the pair of bottom frames.

7. The projector according to claim 1, wherein the support mechanism is integrated in the pair of side frames.

8. The projector according to claim 1, wherein soft material is used as an entirety or a part of the pair of side frames and the pair of bottom frames.

9. The projector according to claim 1, wherein the main body portion defines a rotational shaft serving as a center of a rotational movement of the main body portion, the rotational shaft being provided at a position within a distance of thickness of the pair of side frames from a foremost surface of the housing.

10. A projector comprising:
  a main body portion having, at a front side, a projection surface of light emitted from a built-in light source; and
  a frame portion that protects the main body portion, and having a surface that confronts the main body portion and has a claw portion formed with a concave portion extending in a direction substantially perpendicular to a projection direction in which light is projected.

11. The projector according to claim 10, further comprising a support mechanism that rotatably supports the main body portion with a rotational shaft substantially parallel to a direction in which the concave portion is formed.

12. The projector according to claim 11, wherein the concave portion is formed with a partially cylindrical surface of which an axial direction is substantially perpendicular to the projection direction; and
  wherein the claw portion is located at a position separated from a rotational movement region of the main body portion by a distance larger than or equal to at least 2R where a curvature radius of the concave portion is R.

13. The projector according to claim 11, wherein the main body portion comprises:
  a housing having a projection surface of light emitted from a built-in light source at a front side; and a battery mounted at a rear side of the housing; and
wherein the rotational shaft is provided between the housing and the battery.

14. The projector according to claim 10, wherein the concave portion is formed with a partially cylindrical curved surface of which an axial direction is substantially perpendicular to the projection direction.

15. The projector according to claim 10, wherein the frame portion comprises:
    a pair of side frames that protects side surfaces of the main body portion;
    a pair of bottom frames that extends rearward from lower ends of the pair of side frames and that serves as foot portions;
    a top frame that connects the pair of side frames; and
    a connection frame that connects the pair of bottom frames; and
    wherein the claw portion is provided at the connection frame.

16. A projector comprising:
    a main body portion having, at a front side, a projection surface of light emitted from a built-in light source;
    a pair of side frames protecting side surfaces of the main body portion;
    a pair of bottom frames extending rearward from lower ends of the pair of side frames and that serves as foot portions;
    a top frame connecting the pair of side frames;
    a connection frame connecting the pair of bottom frames; and
    a hook provided at the connection frame.

17. A projector comprising:
    a main body portion comprising:
        a housing having a light source accommodated therein; and
        a battery mounted at a rear side of the housing;
    an LED board having a mount surface on which a plurality of LEDs is mounted, the plurality of LEDs serving as the light source, the LED board being accommodated in the housing such that the mount surface faces toward a front side;
    a transparent plate disposed to confront the mount surface and configured to serve as a projection surface of light emitted from the plurality of LEDs; and
    a cover member bridging over the projection surface while avoiding a projection region of the plurality of LEDs on the projection surface.

18. The projector according to claim 17, wherein a plurality of LED arrays is arranged on the LED board, the plurality of LEDs being arranged in each of the plurality of LED arrays; and
    wherein the cover member bridges over the projection surface at a position between the plurality of LED arrays.

19. The projector according to claim 18, wherein the plurality of LED arrays is arranged with an interval larger than La, where La is a diameter of the projection region in the projection surface.

20. The projector according to claim 17, wherein the cover member has a fringe portion disposed at a periphery of the projection surface.

21. The projector according to claim 20, further comprising:
    a pair of side frames protecting a side surface of the main body portion, and defining a guard region;
    a support mechanism rotatably supporting the main body portion by a rotational shaft substantially perpendicular to the pair of side frames; and
    a pair of bottom frames extending rearward from lower ends of the pair of side frames and serving as foot portions,
    wherein, when the main body portion is rotationally moved, the battery protrudes outside of the guard region only from the pair of side frames.

22. The projector according to claim 21, wherein the housing has a protrusion amount from the pair of side frames to outside of the guard region larger than that of the battery when a rotational range of the main body portion is within 45 degrees relative to a state where the pair of bottom frames is put on ground and the projection surface of the main body portion is oriented vertically so that a projection direction is set horizontally to the front side.

23. An electrical apparatus comprising:
    a main body portion comprising:
        a converting portion that converts electric power to one of light, wind, heat, and sound; and
        an outputting portion that outputs, to outside, the one of light, wind, heat, and sound outputted from the converting portion;
    a battery pack detachably mounted on a battery holder provided at the main body portion and configured to supply electric power to the converting portion; and
    a frame portion that rotatably supports the main body portion;
    wherein the frame portion includes:
        a pair of side frames extending in a vertical direction and located left and right sides of the outputting portion, each of the pair of side frames being bar-shaped;
        a top frame located above the outputting portion in a state where the outputting portion faces the front side, the top frame extending in a leftward/rightward direction and connecting upper ends of the pair of side frames, the top frame being bar-shaped;
        a pair of bottom frames located left and right sides and below the outputting portion when the outputting portion is viewed from a front side in a state where the outputting portion faces the front side, each of the pair of bottom frames extending rearward and having a front end connected to a lower end of corresponding one of the pair of side frames, each of the pair of bottom frames being bar-shaped; and
        a connection frame located below the outputting portion when the outputting portion is viewed from a front side in a state where the outputting portion faces the front side, the connection frame being bar-shaped and connecting rear ends of the pair of bottom frames, the frame portion being an integration of the pair of side frames, the top frame and the pair of bottom frames;
    wherein the pair of side frames, the top frame and the pair of bottom frames are constrained relative to one another;
    wherein the main body portion is positioned between the pair of side frames; and
    wherein the pair of side frames are provided with a support mechanism that rotatably supports the main body portion.

24. The electrical apparatus according to claim 23, wherein in a side view as viewed from one of the pair of side frames, one of the pair of side frames and one of the pair of bottom frames are formed in substantially an L-shape.

25. The electrical apparatus according to claim 24, wherein the pair of side frames protect side surfaces of the main body portion.

26. The electrical apparatus according to claim 25,
wherein in a state where the pair of bottom frames and the connection portion frame are put on ground, a part of the pair of bottom frames and the connection frame are located further rearward than the support mechanism.

27. The electrical apparatus according to claim 23, wherein in a side view as viewed from one of the pair of side frames, an angle formed by one of the pair of side frames and one of the pair of bottom frames is an acute angle.

28. The electrical apparatus according to claim 23, wherein the outputting portion is disposed at the front side of the support mechanism; and
wherein the battery pack is mounted on the main body portion at a rear side of the support mechanism.

29. The electrical apparatus according to claim 28, wherein a part of the battery pack is arranged inside a guard region that is a region surrounded by an outer periphery of the frame portion.

30. The electrical apparatus according to claim 29, wherein, when a part of the outputting portion is located outside of the guard region, the part of the battery pack is located inside of the guard region.

31. The electrical apparatus according to claim 29, wherein the electrical apparatus is a projector;
wherein the main body portion further comprises a housing having a projection surface of light emitted from a built in light source at a forward side of the housing, the battery pack mounted at a rear side of the housing; and
wherein in a side view as viewed from one of the pair of side frames, a part of the battery pack is arranged in the guard region that is a substantially triangle shape when the pair of bottom frames are put on ground and the projection surface is oriented vertically so that a projection direction is set horizontally to the front side, the guard region having one of the pair of side frames and one of the pair of bottom frames as two sides of the triangle shape.

32. The electrical apparatus according to claim 29, wherein the frame portion is provided with a hook configured so that when the hook is hooked on a tube pipe, the battery pack is located inside the guard region and the tube pipe extends through the guard region.

33. The electrical apparatus according to claim 23, wherein the frame portion defines a first ground contact plane that can contact a ground surface and a second ground contact plane that can contact the ground surface at a different angle from an angle of the first ground contact plane; and
wherein, when any one of the first ground contact plane and the second ground contact plane contacts the ground surface, the main body portion and the battery pack are rotatably movable relative to the frame portion without contacting the ground surface.

34. The electrical apparatus according to claim 33, wherein the frame portion is so configured that, in a state where the outputting portion is located at a front side of the support mechanism, the first ground contact plane extends substantially in a frontward/rearward direction at a lower side of the support mechanism and the second ground contact plane extends substantially in the vertical direction at a rear side of the support mechanism.

35. The electrical apparatus according to claim 23, wherein the electric apparatus is a projector;
wherein the main body portion further comprising a housing having a rear face, the battery pack attachable on the rear face; and
wherein the electrical apparatus further comprises:
an LED board having a mount surface on which a plurality of LEDs is mounted, the plurality of LEDs serving as a light source, the LED board being accommodated in the housing such that the mount surface faces toward the front side;
a transparent plate disposed to confront the mount surface and configured to serve as a projection surface of light emitted from the plurality of LEDs; and
a cover member bridging over the projection surface while avoiding a projection region of the plurality of LEDs on the projection surface.

36. The electrical apparatus according to claim 35, wherein a plurality of LED arrays is arranged on the LED board, the plurality of LEDs being arranged in each of the plurality of LED arrays; and
wherein the cover member bridges over the projection surface at a position between the plurality of LED arrays.

37. The electrical apparatus according to claim 36, wherein the plurality of LED arrays is arranged with an interval larger than La, where La is a diameter of the projection region in the projection surface.

* * * * *